US011919155B2

(12) United States Patent
Chintamani et al.

(10) Patent No.: US 11,919,155 B2
(45) Date of Patent: Mar. 5, 2024

(54) AUTONOMOUS MOBILE ROBOT SYSTEM FOR IMPROVED DOCKING WITH A WHEELED CART

(71) Applicant: Tractonomy Robotics BV, Ghent (BE)

(72) Inventors: Keshav Chintamani, Schaerbeek (BE); Geert Dorme, Roeselare (BE)

(73) Assignee: Tractonomy Robotics BV, Ghent (BE)

( * ) Notice: Subject to any disclaimer, the term of this patent is extended or adjusted under 35 U.S.C. 154(b) by 260 days.

(21) Appl. No.: 17/446,029

(22) Filed: Aug. 26, 2021

(65) Prior Publication Data

US 2022/0063085 A1    Mar. 3, 2022

(30) Foreign Application Priority Data

Sep. 1, 2020  (EP) ..................................... 20193796

(51) Int. Cl.
| | | |
|---|---|---|
| *B25J 5/00* | (2006.01) | |
| *B25J 9/16* | (2006.01) | |
| *B25J 13/08* | (2006.01) | |
| *G05D 1/00* | (2006.01) | |
| *G05D 1/02* | (2020.01) | |

(52) U.S. Cl.
CPC ............. *B25J 5/007* (2013.01); *B25J 9/1679* (2013.01); *B25J 13/089* (2013.01); *G05D 1/0088* (2013.01); *G05D 1/0244* (2013.01); *G05D 2201/0216* (2013.01)

(58) Field of Classification Search
CPC ........ B25J 5/007; B25J 9/1679; B25J 13/089; B60D 1/04; B60D 2001/005; B66F 9/063; B66F 9/18; G05D 1/0088; G05D 1/0244; G05D 2201/0216
See application file for complete search history.

(56) References Cited

U.S. PATENT DOCUMENTS

| | | | | |
|---|---|---|---|---|
| 7,448,842 | B2 * | 11/2008 | Schonauer | ................ B66F 9/18 410/80 |
| 8,439,181 | B2 * | 5/2013 | Hausladen | .............. B08B 9/426 198/470.1 |
| 10,233,056 | B1 | 3/2019 | Brauer | |
| 10,514,690 | B1 | 12/2019 | Siegel et al. | |
| 10,668,617 | B2 * | 6/2020 | Jacobsen | ................ B25J 11/008 |
| 2015/0314966 | A1 * | 11/2015 | Fahldieck | ............... B67C 3/242 294/199 |
| 2016/0121490 | A1 * | 5/2016 | Ottersland | ............ E21B 19/155 294/198 |
| 2017/0258222 | A1 * | 9/2017 | Jackson | ................. A47B 81/00 |
| 2017/0320210 | A1 | 11/2017 | Ding et al. | |

FOREIGN PATENT DOCUMENTS

| | | |
|---|---|---|
| CN | 108725108 A | 11/2018 |
| WO | 2016165721 A1 | 10/2016 |

OTHER PUBLICATIONS

Extended European Search Report issued for European Patent Application No. 20193769.8, dated Feb. 10, 2021 In 7 pages.

* cited by examiner

*Primary Examiner* — Jeff A Burke
*Assistant Examiner* — Blake A Wood
(74) *Attorney, Agent, or Firm* — Knobbe, Martens, Olson & Bear, LLP

(57) ABSTRACT

Autonomous or automated mobile robots can be configured for transport and logistics applications. Systems for docking of such robots with wheeled carts can be used in methods for operation of such robots.

20 Claims, 12 Drawing Sheets

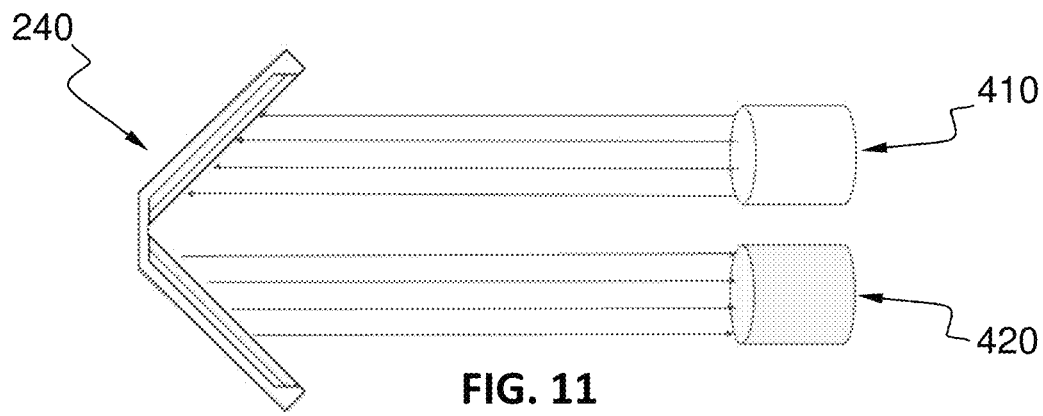
FIG. 11
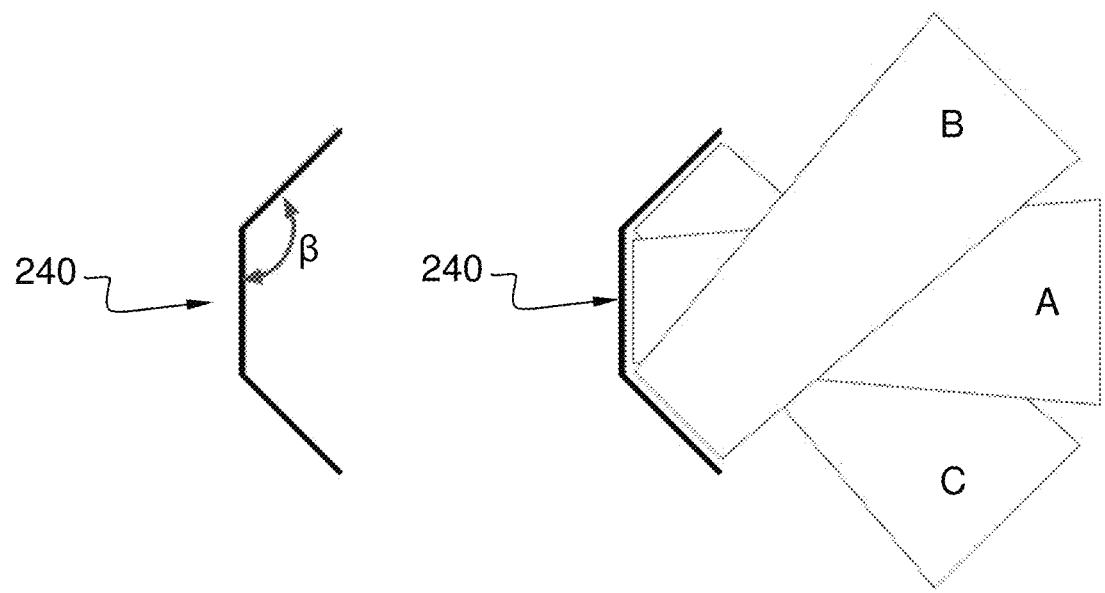
FIG. 12A  FIG. 12B

AUTONOMOUS MOBILE ROBOT SYSTEM FOR IMPROVED DOCKING WITH A WHEELED CART

FIELD OF THE INVENTION

The present invention is in the field of autonomous or automated mobile robots configured in particular for transport and logistics applications. In particular, present invention relates to systems for docking of such robots with wheeled carts. Also, the present invention relates to methods for operation of such robots.

BACKGROUND

Transporting of manufactured goods or raw materials through the pushing or pulling of wheeled industrial carts is a common need in logistics applications. Wheeled carts provide the flexibility to transport loads of different shapes and sizes at a low cost, both indoors and outdoors. Typical wheeled carts may be provided with four independently swivelling wheels, sometimes also including a single fixed central control wheel, or alternatively having swivel wheels at the front, while the rear wheels are fixed in orientation.

In recent years, Autonomous or Automated Mobile Robots (AMRs) or Automated or Automatic Guided Vehicles (AGVs) have become popular alternatives to human-operated cart-towing. To improve the efficiency of AMRs, technology was developed allowing for AMRs to interact with one or more wheeled carts. For example, an AMR may be provided with a lifting mechanism, whereby the AMR drives under a cart and lifts the cart to move it from one position to another. However, the use of a lifting mechanism significantly limits the speed of the AMR for safety reasons and requires high power output.

An alternative to a lifting mechanism is a hooking mechanism. An example of the art includes WO2016/165721, which describes an AMR that is provided with a trailer arm equipped with a hook for hooking the frame of a wheeled cart. This type of mechanism requires the AMR to dock onto the fixed wheel side of a cart that is equipped with a perfectly horizontally-oriented bar during cart fabrication to form a secure docking point, hence making it unsuitable for generic wheeled carts.

However, because the orientation of the hooking mechanism must be fixed relative to the cart's docking point, it becomes difficult to achieve a quick docking of the cart, especially if the cart is not parked perfectly for the approaching AMR. This limitation also prevents the AMR from pulling a cart out of a difficult to reach position, or from maneuvering it into an oblique parking position by controlled pushing. Moreover, the ability of an AMR to push a cart into a parking position (a reverse movement) is accomplished by a basic compensatory controller that counters the movement of the cart by an opposing counter movement of the AMR during reversing. If a cart is too heavy or moved unexpectedly e.g. by collision with an undetected object, this mechanism may become a safety risk. Positioning of the hooking mechanism relative to the wheeled cart, with limited perception of the docking point, leads to increased docking times. Any inadvertent contact with the hooking mechanism may also push the wheeled cart away from the AMR It is well known that, due to human error, wheeled carts may never be parked in perfectly parallel or collinear positions. Thus, for efficient docking the AMR must be able to not only identify the exact location of the cart, but also determine its orientation and the exact position of the docking point. Another issue in the art is that the orientation of the AMR relative to the wheeled cart is typically determined through optical sensors e.g. colour cameras including monocular or stereo imagers, infra-red or laser range finders, or radio-frequency methods e.g. RFID. Gross and general position estimations can theoretically be determined by combining contemporary colour and range finders with computer vision and image processing techniques. However, optical sensors are limited by range, resolution and the surrounding lighting conditions, and the processing algorithms may impose severe constraints on the available computational resources of a typical industrial AMR. Radio-frequency methods are prone to signal attenuation errors in industrial environments of metal construction, for example, carts, racks, equipment, are more complicated to setup or do not provide the reliability required for AMR docking. In view of the above, there is a need to remedy the issues and limitations of state of art systems.

SUMMARY OF THE INVENTION

As described above, there is a need to remedy the issues and limitations of state of art autonomous or automated mobile robots (AMRs) in particular for transport and logistics applications such as docking and handling of wheeled carts. To this end, the present invention provides a solution that may improve the speed, efficiency, and safety of an AMR for docking, transporting and handling of generic wheeled carts. Moreover, the present invention may enable docking and handling approaches that are particularly difficult or impossible to achieve for a state of art AMR, such as docking with an improperly parked wheeled cart, coupling with a wheeled cart when its wheel brakes are not applied, maneuvering a wheeled cart past unexpected obstacles, extracting a wheeled cart from a difficult to reach location, and/or parking a cart into an oblique parking position. Further, provided herein are also possible modifications to the present invention in the form of alternative or preferred embodiments, which may further improve the efficiency, user-friendliness, and usability thereof. In particular, embodiments of the present invention may provide for improved docking and handling approaches in poor lighting conditions e.g. lack or excessive environment lighting. Also, embodiments of the present invention may provide for a more efficient use of space and resources, i.e., improving the AMR navigation and/or reducing the required AMR computational power, which may reduce the operating costs thereof.

An aspect of the present invention relates to an autonomous mobile robot system for docking with a wheeled cart; the wheeled cart being provided with a coupling structure comprising: a frame hitch; at least two elongated gripping elements, which are disposed equidistant from a centre of the frame hitch; and the AMR comprising a robot body comprising at least one optical unit, a driving system or drive system for moving the robot body and a mobile drive unit configured for automated navigation of said robot body; a cart coupling system comprising at least two robot arms extending from said robot body, each robot arm being provided with at least one gripper hand configured for gripping of at least one gripping element.

In some preferred embodiments the gripper hand comprises at least two pivotable gripper members, which are arranged to pivot between an open and a closed position of said gripper hand, a gripper biasing member for biasing said gripper members towards the open position of said gripper hand, a moveably arranged latch, which is arranged to lock said gripper members in the closed position of said gripper hand, and a latch biasing member for biasing said latch towards said gripper members.

In some preferred embodiments the gripper hand comprises a proximity sensor configured for detecting the presence of the gripping element within the gripper hand; wherein the proximity sensor is operatively connected to the latch and configured to prevent the latch from unlocking the gripper members upon detection of the presence of said gripping element.

In some preferred embodiments the gripper hand comprises a guiding structure extending from the gripper members, which is configured to guide the gripping element towards the gripper members; preferably wherein the guiding structure has a broad entry point that tapers towards the gripper members at an angle of 45° to 80°, preferably 55° to 75°.

In some preferred embodiments the gripper hand comprises a damping member disposed between the robot arm and the gripper hand, which is configured to dampen forces exerted on said gripper hand and/or to enable angular adjustments of said gripper hand.

In some preferred embodiments the robot arm is mechanically connected to at least one central connective joint and at least two lateral swing joints; wherein each swing joint is at one end pivotably connected to said robot arm and at the other end rotatably connected to the robot body.

In some preferred embodiments the cart coupling system comprises a robot arm actuator configured to simultaneously drive the connective joints of the at least two robot arms, which translates into a sideways curved motion of said robot arms relative to the robot body, such that the robot arms can be retracted into the cart coupling system or extended from the cart coupling system.

In some preferred embodiments the cart coupling system comprises a robot arm actuator configured to simultaneously drive the connective joints of the at least two robot arms, which translates into a sideways curved motion of said robot arms relative to the robot body, such the distance between the gripper hands provided on said robot arms can be increased and/or decreased.

In some preferred embodiments the cart coupling system comprises a rotating system, which is configured to rotate the cart coupling system relative to the robot body about a rotation axis.

In some preferred embodiments the cart coupling system comprises a docking control system, which is configured to track the position of at least three reference points and a rotating angle $\alpha$; wherein the reference points include a first reference point $P_{GE}$ positioned along a first axis running through the gripping elements, a second reference point $P_{GH}$ positioned along a second axis running through the gripper hands and a third reference point $P_R$ positioned on the rotation axis cart of the rotating system; wherein the rotating angle $\alpha$ is defined as the angle between the cart coupling system and the robot body when rotating with the rotating system.

In some preferred embodiments the cart coupling system comprises a docking control system, which is configured to determine, from changes in the position of at least one tracked reference point and/or the rotating angle $\alpha$, a docking correction factor for adjusting an orientation of the AMR, a movement of the robot body and/or a rotation of the cart coupling system.

In some preferred embodiments the coupling structure provided on the wheeled cart comprises a reflector unit which is configured to selectively reflect light from a light source;
wherein the AMR comprises an orientation control system, which comprises a broadband light emitter, a narrowband light sensor and an orientation control unit operatively connected to the mobile drive unit.

In some preferred embodiments the orientation control system is configured to
emit, from the broadband light emitter, light onto the reflector unit;
record, with the narrowband light sensor, light selectively reflected by said reflector unit;
determine, from the wavelength and optionally intensity of the recorded light, an orientation of the AMR relative to the wheeled cart; and,
determine, an orientation correction factor for adjusting an orientation of the AMR, a movement of the robot body and/or a rotation of the cart coupling system.

In some preferred embodiments the coupling structure comprises at least two reflector units, each reflector unit being arranged behind each gripping element.

In some preferred embodiments the coupling structure comprises a central reflector unit arranged at a centre of the frame hitch and optionally at an elevated position relative to the other reflector units.

In some preferred embodiments wherein the reflector unit comprises at least three reflectors including a central reflector, a left reflector, and a right reflector; wherein the left and right reflectors are each arranged at opposite sides of the central reflector and disposed at an angle $\beta$ towards the central reflector; wherein each reflector is configured to selectively reflect light in a different wavelength or wavelength range, each wavelength or wavelength range being associated by the orientation control system with a different orientation of the AMR relative to the wheeled cart, said AMR orientations including at least a centred orientation, a right orientation and a left orientation of the AMR relative to the wheeled cart.

In some preferred embodiments the orientation control system is configured to modulate the light emitted by the broadband light emitter with a modulation signal and to record light corresponding with the modulation signal and/or filter light without the modulation signal.

In some preferred embodiments the orientation control system is configured to modulate the light emitted by the broadband light emitter with a pulse-width modulation signal.

An aspect of the present invention relates to a method for docking an AMR with a wheeled cart, preferably by means of the cart coupling system as described herein.

In some preferred embodiments, the method comprises:
(i) pushing a gripping element against at least two pivotable gripper members of a gripper hand, which are biased by a gripper biasing member towards an open position of said gripper hand, such that said gripper members pivot around said gripping element into a closed position of said gripper hand, thereby tensioning said gripper biasing member; and,
(ii) pushing a moveably arranged latch, which is biased by latch biasing member towards the gripper members, against said gripper members, thereby locking said gripper biasing member in the closed position of said gripper hand; and optionally,
(iii) detecting, with a proximity sensor, the presence of the gripping element within the gripper hand and preventing the latch from unlocking the gripper members upon detection of the presence of said gripping element.

In some preferred embodiments, the method comprises:
tracking a position of a first reference point $P_{GE}$ positioned along a first axis running through at least two gripping elements of a coupling structure;
tracking a position of a second reference point $P_{GH}$ positioned along a second axis running through the at least two gripper hands of a cart coupling system;
tracking a position of a third reference point $P_R$ positioned on the rotation axis of a rotating system of the cart coupling system;
tracking a rotating angle α, which is defined as the angle between the cart coupling system and a robot body when rotating with the rotating system; and,
determining, from changes in the position of at least one tracked reference point and/or the rotating angle α, a docking correction factor for adjusting a movement of the robot body and/or a rotation of the cart coupling system.

In some preferred embodiments, the method comprises:
(a) emitting, from a broadband light emitter, light onto a reflector unit of the coupling structure;
(b) selectively reflecting, with a reflector unit, the emitted light at a specific narrowband wavelength; wherein the narrowband wavelength corresponds with an orientation of the AMR relative to the wheeled cart; preferably by selectively reflecting of light in one of at least three narrowband wavelengths or wavelength ranges, each wavelength or wavelength range being associated with a different orientation of the AMR relative to the wheeled cart;
(c) recording, with a narrowband light sensor, the selectively reflected light;
(d) determining, from the narrowband wavelength and optionally intensity of the recorded light, an orientation of the AMR relative to the wheeled cart; preferably by determining one of one of at least three AMR orientations, said AMR orientations including at least a centred orientation, a right orientation and a left orientation of the AMR relative to the wheeled cart;
(e) determining, from said AMR orientation, an orientation correction factor for adjusting an orientation of the AMR; preferably by adjusting a movement of the robot body and/or a rotation of the cart coupling system.

The present invention in a further aspect relates to a use of the AMR as described herein for docking with a wheeled cart.

The present invention in a further aspect relates to a use of the cart coupling system as described herein for docking an AMR with a wheeled cart.

The present invention in a further aspect relates to a use of the docking control system as described herein for docking an AMR with a wheeled cart.

The present invention in a further aspect relates to a use of the orientation control system as described herein for docking an AMR with a wheeled cart.

BRIEF DESCRIPTION OF THE DRAWINGS

The following description of the figures of specific embodiments of the invention is merely exemplary in nature and is not intended to limit the present teachings, their application or uses.

Throughout the drawings, the corresponding reference numerals indicate the following parts and features: (10) AMR; (100) robot body; (200) coupling structure; (210) frame hitch; (220) gripping element; (240) reflector unit; (300) cart coupling system; (310) robot arm; (320) gripper hand; (321) gripper member; (322) gripper biasing member; (323) guiding structure; (324) proximity sensor; (325) moveably arranged latch; (326) latch biasing member; (327) damping member; (350) robot arm actuator; (355) robot arm connective joint; (360) robot arm swing joint; (370) rotating system; (375) rotating system actuator; (380) lifting system; (400) orientation control system; (410) broadband light emitter; (420) narrowband light sensor; (500) wheeled cart

FIG. 11 is a working principle of a reflector unit (240) according to a preferred embodiment of the invention.

FIG. 12A is a working principle of the reflector unit (240).

FIG. 12B is a working principle of the reflector unit (240).

DETAILED DESCRIPTION

Figure 1:
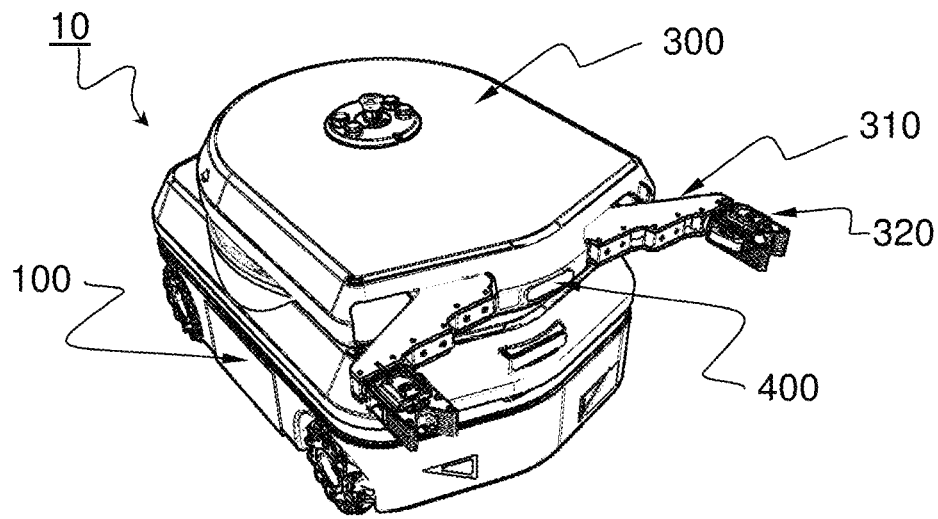
FIG. 1 is a perspective view of the AMR (10) according to a preferred embodiment of the invention.

The present invention will be described with respect to particular embodiments, but the invention is not limited thereto but only by the claims. Any reference signs in the claims shall not be construed as limiting the scope thereof.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" when referring to recited members, elements or method steps also include embodiments which "consist of" said recited members, elements or method steps.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The recitation of numerical ranges by endpoints includes all numbers and fractions subsumed within the respective ranges, as well as the recited endpoints.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the invention, and form different embodiments, as would be understood by those in the art. For example, in the following claims and description, any of the claimed or described embodiments can be used in any combination.

In the field of transport and logistics there is a need to remedy the issues and limitations of state of art autonomous or automated mobile robots (AMRs). To this end, the present invention provides a solution that may improve the speed, efficiency and safety of an AMR for docking, transporting and handling of generic wheeled carts. Docking as used herein may refer to the AMR approaching the wheeled cart and subsequently coupling with it. Moreover, the present invention may enable docking and handling approaches that are particularly difficult or impossible to achieve for a state of art AMR, such as extracting a wheeled cart from a difficult to reach location, docking with an improperly parked wheeled cart, coupling with a wheeled cart when its wheel brakes are not applied, maneuvering a wheeled cart past unexpected obstacles, and/or parking a cart into an oblique parking position. Further, provided herein are also possible modifications to the present invention in the form of alternative or preferred embodiments, which may further improve the efficiency, user-friendliness and usability thereof. In particular, embodiments of the present invention may provide for improved docking and handling approaches in poor lighting conditions e.g. lack or excessive environment lighting. Also, embodiments of the present invention may provide for a more efficient use of space and resources, i.e., improving the AMR navigation and/or reducing the required AMR computational power, which may reduce the operating costs thereof.

An aspect of the present invention relates to an autonomous mobile robot system for docking with a wheeled cart; the wheeled cart being provided with a coupling structure comprising: a frame hitch; at least two coupling elements, which are disposed equidistant from a centre of the frame hitch; and the AMR comprising a robot body comprising at least one optical unit, a driving system for moving the robot body and a mobile drive unit configured for automated navigation of said robot body; a cart coupling system comprising at least two robot arms extending from said robot body, each robot arm being provided with at least one coupling means configured for coupling with at least one coupling element.

In a preferred embodiment the coupling structure is provided with at least two elongated gripping elements, such as rods, and the cart coupling system is provided with a gripper hand, which is configured for gripping of at least one gripping element; wherein the gripper hand comprises at least two pivotable gripper members, which are arranged to pivot between an open and a closed position of said gripper hand, a gripper biasing member for biasing said gripper members towards the open position of said gripper hand, a moveably arranged latch, which is arranged to lock said gripper members in the closed position of said gripper hand, and a latch biasing member for biasing said latch towards said gripper members.

The industrial wheeled cart or as shortened herein "cart" refers to a vehicle that is designed for transporting of manufactured goods or raw materials in logistic applications, such as in a warehouse or between shipping systems. A generic wheeled cart typically consists of a frame made of metal or a combination of metal and plastic that is fitted with four wheels. Typical carts may be provided with four independently swivelling wheels, sometimes also including a single fixed central control wheel, or alternatively having swivel wheels at the front, while the rear wheels are fixed in orientation. Wheeled carts can come in many shapes and sizes, depending primarily on the volume of the transported goods or materials and the available storage space. The skilled person understand that the present invention is by no means limited to any particular cart configuration and the various embodiments described herein merely represent illustrative examples to better understand the functionality of the present invention.

The coupling structure for the wheeled cart may be fixed to said cart by means of fasteners, such as screws or other hardware elements, which mechanically fix the coupling structure to said cart. Advantageously, the coupling structure may be reversibly fixed, which allows the coupling structure to be detached from the cart. This configuration may for instance improve the compatibility with older carts, which may have been produced prior to development of the present invention. Alternatively, the coupling structure may already be provided during cart production.

The coupling structure may comprise a frame hitch. The frame may be provided with one or more fixing points for fixing the frame to the wheeled cart. Typically, the fixing points may be disposed on the rear or back of the frame, i.e., the part or section of the hitch that is oriented towards the cart, or the hitch may be provided with openings that form entry points for fasteners. The frame may be constructed from several different materials that may impact its durability, resistance, appearance and functionality. Preferred construction materials may include metals, such as stainless steel, which is particularly well suited for displacement of heavy loads and can resist wear.

The coupling structure may comprise a coupling element configured for coupling with the coupling means provided on the AMR. In a preferred embodiment the cart coupling element comprises an elongated gripping element, such as a bar, rod or the like. Advantageously, the gripping element may be oriented vertically or horizontally, which may enable easier gripping thereof. The gripping element may also be structural member of the wheeled cart, such as a part of the frame, which can be equally suitable for gripping by means of the herein discussed gripping system. The cart coupling element and in particular the gripping element may be mounted or affixed onto an existing the wheeled cart, i.e., after production, or alternatively may be integrated into the wheeled cart frame during its production.

The gripping element may be provided with further features to improve its functionality such as a friction reducing surface coating or modification. The diameter of the gripping element may be adjusted to fit into the AMR gripper hand described further below, for example according to the towing weight of a cart.

In a preferred embodiment the coupling structure comprises at least two coupling elements configured for coupling with a separate coupling means provided on the AMR. The provision of additional coupling elements may increase the docking reliability during towing. The coupling elements may be disposed equidistant from a centre of the frame hitch. This arrangement may allow the AMR to determine the position of the second coupling element more accurately when coupling with the first coupling element. The coupling mechanism is discussed further below.

The coupling structure may comprise a reflector unit configured to selectively reflect incident light from a light source, i.e., a selective light reflector unit. Selective light reflection as used herein refers to a reflector unit configuration wherein only light in a pre-selected narrow wavelength is reflected; the non-reflected light may for example be absorbed, filtered or attenuated. Advantageously, when broadband light is emitted onto the reflector unit surface, the broadband light wavelength component corresponding with the selected wavelength or wavelength range may be reflected by the reflector unit while reflection of the remaining broadband light wavelength component may be cancelled.

There exist various techniques to achieve selective reflection known to those skilled in the art. For example, the reflector unit may be provided with a reflective surface configured to selectively reflect light of a specific narrowband wavelength and not reflect light outside of said specific narrowband wavelength. For example, the reflector unit may be provided with a filter configured to pass light of a specific narrowband wavelength and filter light outside of said specific narrowband wavelength. An example thereof is shown in FIG. 11. As such, the present invention is understood to not be limited to a particular reflection technique.

Preferably, the reflector unit may be configured to selectively reflect light in at least three wavelength ranges, such that each wavelength range can be associated by the AMR orientation control unit with an AMR orientation relative to the cart; said AMR orientation including at least a central orientation, a right orientation and a left orientation. This configuration may allow for quickly determining the position of the AMR relative to the reflector unit and by extension the cart. Nonetheless, it may be appreciated that by increasing the number of reflected wavelength ranges by the reflector units and/or the number of reflector unit components, the detection accuracy may be increased.

In a preferred embodiment the reflector unit may comprise at least three reflectors including a central reflector, a left reflector, and a right reflector. Preferably, each reflector may be provided as a planar structure, for example a reflector panel, which can be mounted on the frame hitch. The left and right reflector may each be arranged at opposite sides of the central reflector and disposed at an angle towards the central reflector i.e., the central reflector, and the at least two other reflectors may be disposed at each side of the central reflector and oriented at angle towards said central reflector, i.e., left reflector and right reflector. Each reflector may be configured to selectively reflect light in a different wavelength or wavelength range, such that each wavelength or wavelength range can be being associated with an orientation of the AMR relative to the wheeled cart; said orientation preferably including at least a centred orientation, a right orientation and a left orientation.

Hence, the reflector unit may comprise at least three reflectors including a central reflector, a left reflector and a right reflector; wherein each reflector is configured to reflect light of a different wavelength and/or wavelength range. Further clarification may be provided with reference to the figures, for example FIG. 12. Additionally, each reflector may be configured to reflect light of multiple distinct wavelengths and/or distinct wavelength range. This may provide for a redundant system that is resilient to the existence of cross-over wavelengths from surrounding light sources. Also, the angle or spread of reflectance of the reflected narrowband light can be adjusted to increase the angular resolution of the coupling structure relative to the AMR. Preferably, an array of reflectors can be included in a single reflector unit. In a preferred embodiment, a plurality of reflectors may be arranged in a lattice or array arrangement. This configuration may improve the collection and reflection of the emitted wavelengths.

Additionally, the reflector unit may also be configured to selectively attenuate the intensity of the reflected light. This may allow for associating the reflected light intensity can be associated by the AMR orientation control unit with an AMR orientation relative to the cart. Preferably, at least two light reflection intensities are provided including a full light intensity, i.e. no light attenuation, and partial light intensity, i.e. partial light attenuation. This configuration may enable allowing the reflected light intensity to act as a control signal for determination of the AMR orientation as is described further below.

Additionally, the reflector unit components may be arranged in different orders between different coupling structures. This may enable the AMR, in particular the AMR orientation control unit, to assign a unique numerical identifier for each reflector unit depending on the order. The numerical identifier may for example be used to distinguish different hitch types (e.g. distance between coupling elements), load types (e.g. heavy load, fragile goods, etc.) or logistic instructions. The reflector unit may also be provided with other identifier means, such as bar-codes, QR-codes, colour codes, and so on.

The coupling structure may comprise a plurality of reflector units to improve the selective light reflection from different position of the AMR relative to the coupling structure. In a preferred embodiment the coupling structure may comprise at least two reflector units, each reflector unit being arranged centrally behind each of the at least two gripping elements. This may enable the AMR orientation system to track the position a specific gripping element relative to the gripper hand during docking. Additionally, the coupling structure may further comprise a central reflector unit arranged at a centre of the frame hitch. The central reflector unit may be aligned with the coupling structure frame and may enable the below discussed AMR orientation system to determine the centre of the coupling structure and thus improve its positioning relative to said coupling structure. Advantageously, the central reflector may be arranged at an elevated position relative to the other reflector units e.g. arranged behind a gripping element, such that it can be more easily distinguished and/or detected from a greater distance.

The autonomous or automated mobile robot or as abbreviated herein "AMR" is a vehicle capable of carrying out logistical tasks of within a production environment, which tasks include, amongst others, the automated docking, transporting and handling of the above-discussed carts. The skilled person may appreciate that the present invention may also be adjusted for other types of mobile robots, ay such as automatic guided robots "AGRs".

The typical main components of an AMR may include one or more control units, optical units, driving system, actuators and power systems. The controller may include a microprocessor or embedded microcontroller configured for performing the task assigned to the AMR. The optical units may, for example, include one or more cameras, built-in sensors and laser scanners to record optical data. The optical data may be processed by the control unit to improve navigation of the AMR to carry out the logistic tasks by e.g. collision avoidance, position location, detection of loads or carts, and so on. The actuators may, for example, include rotary actuators or a motor to actuate the driving system. Actuators specific to the present invention may be found discussed further below. The AMR may typically be powered by a DC power supply or battery. The skilled person understand that the present invention is by no means limited to any particular AMR configuration and the various embodiments described herein merely represent illustrative examples to better understand the functionality of the present invention.

The above listed typical components may commonly be arranged within a robot body, which provides a supportive and protective housing for the main components and further ancillary components e.g. electronics. The exterior of the AMR may have a housing surrounding the periphery of the robot body unit to further protect it from the exterior e.g. in collision. Additionally, other electro-mechanical components for the operation of the AMR may also be disposed within the housing. The robot body housing may thus fully enclose and protect the internal components.

As described above, the robot body may comprise a driving system for moving or driving the robot body. Various driving technology is known in the art, such as normal wheels, omnidirectional wheels, actuated tracks, and others. The skilled person understands the advantages and disadvantages of each technology. In a preferred embodiment the driving system may comprise at least three, preferably four, omnidirectional wheels for the improved freedom of movement of the AMR. A suitable example of an omnidirectional wheel may include the Mecanum wheel. Advantageously, the driving system may also comprise a suspension system to stabilise the robot body during movement and/or to account for variations of forces and torques between the towing system and the cart during towing.

The robot body may further comprise a mobile drive unit configured for automated navigation of the AMR. The mobile drive unit may comprise a processing unit that is operatively connected to the driving system and is configured for controlling the driving system to drive the AMR to a target location. The mobile drive unit may further comprise a navigational unit configured to automatically determine a position of the AMR and/or it may receive navigational instructions e.g. location coordinates from an external source. The mobile drive unit may also be configured to determine and control driving related parameters, such as linear driving speed (m/s), angular driving speed (degrees/sec) and driving direction. For example, the driving speed may be lowered when fragile goods are being transported.

The AMR may comprise a cart coupling system configured for coupling with the coupling structure provided on the cart. In particular, the cart coupling system may comprise a robot arm extending from the robot body, wherein the robot arm is provided with at least one coupling means configured for coupling with the coupling element of the cart coupling structure. Preferably, the coupling system may comprise at least two robot arms, each robot arm being provided with at least one coupling means, such that each robot arm may couple with a separate coupling element of the cart coupling structure.

The cart coupling system may comprise a gripper hand, which is mounted on the robot arm and is configured for gripping an elongated gripping element, such as a bar or rod provided on the cart coupling structure. The gripper hand may comprise two pivotable gripper members. The gripper members may be arranged at opposite sides of the gripper hand and oriented towards such that the pivoting of each gripper members causes said members to move close or away from each other. As a result of the pivoting motion of the gripper members, the gripper hand may switch from an open position, wherein the gripper members are separated, and a closed position, wherein the engaging members are adjacent or connected.

The gripper members may be biased by a gripper biasing member, such as a torsion spring. Preferably, the gripper biasing member biases said the gripper members towards the open position of said gripper hand, such that gripper biasing member can keep the gripper members in an open position when no gripping is required, or it may push the gripper members to an open position from a closed position. Preferably, the pivoting of the gripper members to a closed position may cause the gripper biasing member to be tensioned. This way the gripping element can be more reliably released.

Between the gripper members space may be provided, located centrally between the gripper members, which advantageously corresponds with the diameter of the gripping element. The diameter of the gripping element may also be adjusted to fit into the space between the gripper members. Preferably, each gripper member has a specific curvature such that when the gripper element is pressed into contact with the gripper hand, the gripper members can pivot symmetrically around the gripper element. The gripper member surface may be modified to reduce the amount of friction with the gripping element, e.g. provision of a different surface material or coating.

In the herein described configuration the gripper hand may be closed by pushing a gripping element against the pivotable gripper members, such that said gripper members pivot around said gripping element into the closed position of said gripper hand. As a result, the gripper biasing member may be tensioned. The sensitivity of the gripper biasing member can be set such that even a very light unloaded cart can be reliably gripped, even if it moves away from the AMR due to a reactionary force. This may provide an advantage over systems of the art, where either a brake must be applied on the carts wheel, or the cart must be laden with sufficient load to prevent it from rolling away.

The cart coupling system may further comprise a moveably arranged latch, which is arranged to lock said gripper members of said gripper hand, i.e., a gripper member locking latch. The latch may lock the gripper member in an open and/or closed position. Preferably, the moveably arranged latch is arranged to lock said gripper members in the closed position of said gripper hand. The gripper members may be mechanically locked by the locking latch by moving at least a portion of said latch against each gripper members. In a preferred embodiment the gripper members may be provided with a slot on the rear, i.e., opposite to where the gripping element is placed. Advantageously, each gripper member is provided with a complementary notch, which when the gripper member pivot into the closed position, align to form a slot that has a size corresponding with a portion of said locking latch. For example, the rear of the gripper members may be provided with a curved shape. The latch can then move into said slot to block further movement of each gripper member, thereby achieving a reliable locking mechanism.

The moveably arranged latch may be biased by a latch biasing member, such as a helical spring. Preferably, the latch biasing member biases said latch towards said gripper members, such that latch biasing member can push the latch to lock the gripper members when they pivot into a closed position. This way the gripper members can be more reliably locked. Preferably, the pivoting of the gripper members to an open position may cause the latch biasing member to be tensioned. The latch biasing member may be tensioned by a latch actuator, which is configured to open the latch and thereby open the gripper hand. For example, the latch actuator may be activated by the docking control system in preparation for a docking with a wheeled cart or to release a wheeled cart after handling.

The inventors found that the combination of the above-discussed gripper hand configuration provides for a particularly efficient cart coupling system. In particular, during docking the AMR pushes a gripper hand against an incoming gripping element, which in turn pushes the gripper members towards a closed position of the gripper hand, thereby gradually tensioning the gripper biasing member. At the instant that the gripper members reach the closed state, the latch, accelerated by a tensioned latch biasing member, will move at a high speed into a slot formed by the aligned notches provided at the rear of each gripper member. However, as discussed above, the gripper biasing member will be fully tensioned in this closed state. As such, when the latch actuator opens the latch, thereby releasing the locked gripper members, the gripper members, accelerated by the tensioned gripper biasing member, will pivot at a high speed towards the open position. The combination of gripper members that are biased by a gripper biasing member tensioned in the open position and a locking latch that is biased by a latch biasing member tensioned in the closed position, may thus provide for cart coupling system that can quickly grip and release the gripping element, and may also be less prone to system or detection errors, thereby improving the cart coupling system reliability in comparison to similar coupling systems of the art. Further clarification is provided with reference to the figures, in particular FIG. 5, which shows the gripper hand in an open position, and FIG. 6, which shows the gripper hand in a closed position.

Additionally, the gripper hand may comprise a proximity sensor configured for detecting the presence of a gripping element within the gripper hand. For example, the proximity sensor may be an inductive sensor that uses the principle of electromagnetic induction to detect the presence of said gripping element. In a preferred embodiment the proximity sensor may be operatively connected to the latch or a latch controlling mechanism, such as the latch actuator, and also be configured to prevent said latch from unlocking the gripper members upon detection of the presence of a gripping element within the gripper hand. This may prevent accidental release of the gripping element, for example when the AMR is moving or handling the wheeled cart.

Additionally, the gripper hand may comprise a guiding structure extending from the gripper member to guide the gripping element towards the gripper members, in particular the central gripping point between the gripper members. The guiding structure may compensate for small positioning errors of the AMR during docking manoeuvres. As such, the guide structure may allow the AMR to secure a docking by accelerating the gripper members towards the gripping element e.g. by movement of the AMR and/or the robot arms.

In a preferred embodiment the guide structure may have a broad entry point tapered towards the gripper members. The broad entry point may enable the AMR to guide the gripper hand around the gripping element at very wide angles between the normal of the cart and the normal of the AMR. In a preferred embodiment the guiding structure has an opening angle of 45° to 80°, preferably 50° to 75°, or 55° to 75°, or 60° to 75°, more preferably 65° to 75° or 70° to 75°.

Additionally, the gripper hand may comprise a damping member disposed between the robot arm and the gripper hand. The damping member may be configured to dampen forces exerted on said gripper hand, for example during docking with the cart. Also, the damping member may be configured to provide a degree of flexibility to the gripper hand, which may account for angular changes and flexion between the gripper hand and the gripping element during handling of the cart by the AMR and thus enable angular adjustments of said gripper hand. For example, this may help accommodate changes in elevation and inclination between the AMR's ground contact surface and the cart's ground contact surface.

The cart coupling system may be provided at least one actuated system which is configured to move or rotate to the cart coupling system or components thereof e.g. robot arms relative to the robot body. Each actuated system is discussed further below. These systems may include, an extension/retraction system;
a gripper distance system;
a rotating system; and/or
a lifting system.

The cart coupling system may comprise an extension/retraction system, which is configured to retract at least one robot arm, preferably all robot arms, and/or at least one gripper hand preferably all gripper hands, into the cart coupling system, for example into a housing of said cart coupling system. In the fully retracted position of the robot arms, the cart coupling system can be fully stowed inside the robot body to prevent inadvertent contact with personnel or equipment. Such a system may provide several benefits to minimize the dimensions of the AMR when no interactions with carts are required, for example, during transportation, battery charging or when used for other logistics tasks. Similarly, the extension/retraction system may then extend said robot arm and/or gripper hand from said cart coupling system. The robot arms may be individually or simultaneously retracted and/or extended.

The cart coupling system may comprise a gripper distance system, which is configured to adjust e.g. increase or decrease the distance between at least two gripper hands, i.e., the distance from a first gripper hand mounted on a first robot arm to second gripper hand mounted on a second robot arm. The gripper distance system may enable docking of the same AMR with different wheeled carts that are provided with coupling structures wherein the distance between the elongated gripping elements is different. This may for example occur due to differences in the sizes of the wheeled carts.

In some preferred embodiments the cart coupling system comprises a robot arm actuator configured to simultaneously drive the connective joints of the at least two robot arms, which translates into a sideways curved motion of said robot arms relative to the robot body, such the distance between the gripper hands provided on said robot arms can be increased and/or decreased.

In a preferred embodiment the robot arm may be mechanically connected to at least one centrally arranged connective joint, i.e., the connective joint is arranged in a centre of the cart coupling system relative to the gripper arm, and also connected to at least two laterally arranged swing joints, i.e., the swing joint is arranged at a lateral portion of the cart coupling system relative to the gripper arm. Each swing may at one end pivotably be connected to said robot arm and at the other end rotatably connected to the robot body, such that it may swing the robot arm along a curved path relative to the robot body. Further, the cart coupling system may comprise a robot arm actuator configured to simultaneously drive the connective joints of each robot arm.

Due to the present configuration, by simultaneously actuating the connective joints of each robot arm, the movement of each robot arm connective joints may translate into an extension or a retraction of the robot arms along a curved path relative to the robot body, such that the robot arms can be at least partially retracted into the cart coupling system or extended from the cart coupling system. Additionally, the present configuration may also enable adjusting the distance between the gripper hands provided on said robot arms, i.e., by simultaneous sideways motion of the robot arms in opposite directions the distance between the gripper hands may be increased or decreased, while also ensuring that each gripper hand can be kept at an equal distance from the robot body centre.

The inventors found that the above-discussed robot arm configuration provides for a particularly efficient cart coupling system. In particular, this configuration allows the extension/retraction system and the gripper distance system to be combined into a single cart coupling system, thereby reducing the system complexity, which in turn may improve the system reliability. Further clarification is provided with reference to FIG. 4.

The cart coupling system may comprise a lifting system configured to adjust the height of the cart coupling system relative to the robot body. In particular, the lifting system may be configured to lift and/or lower the position of the cart coupling system relative to the robot body, such that the height of at least one robot arm, preferably all robot arms, and/or at least one gripper hand, preferably all gripper hands, can be changed relative to the robot body. The lifting mechanism is particularly beneficial for arrangements wherein the coupling structure cannot be accommodated at the lower regions of the cart and hence would be out of reach for the cart coupling system.

Figure 18:
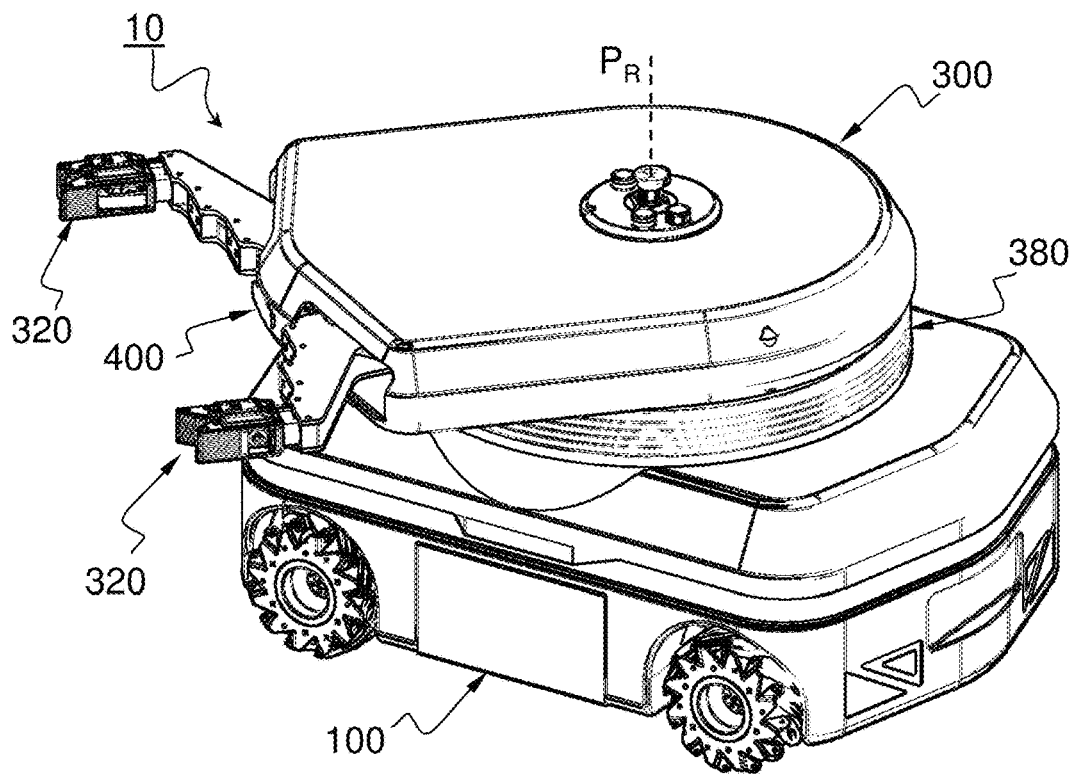
FIG. 18 is a side perspective view of a lifting mechanism (380) of the cart coupling system (300) according to a preferred embodiment of the present invention in a lifted position.
Figure 19:
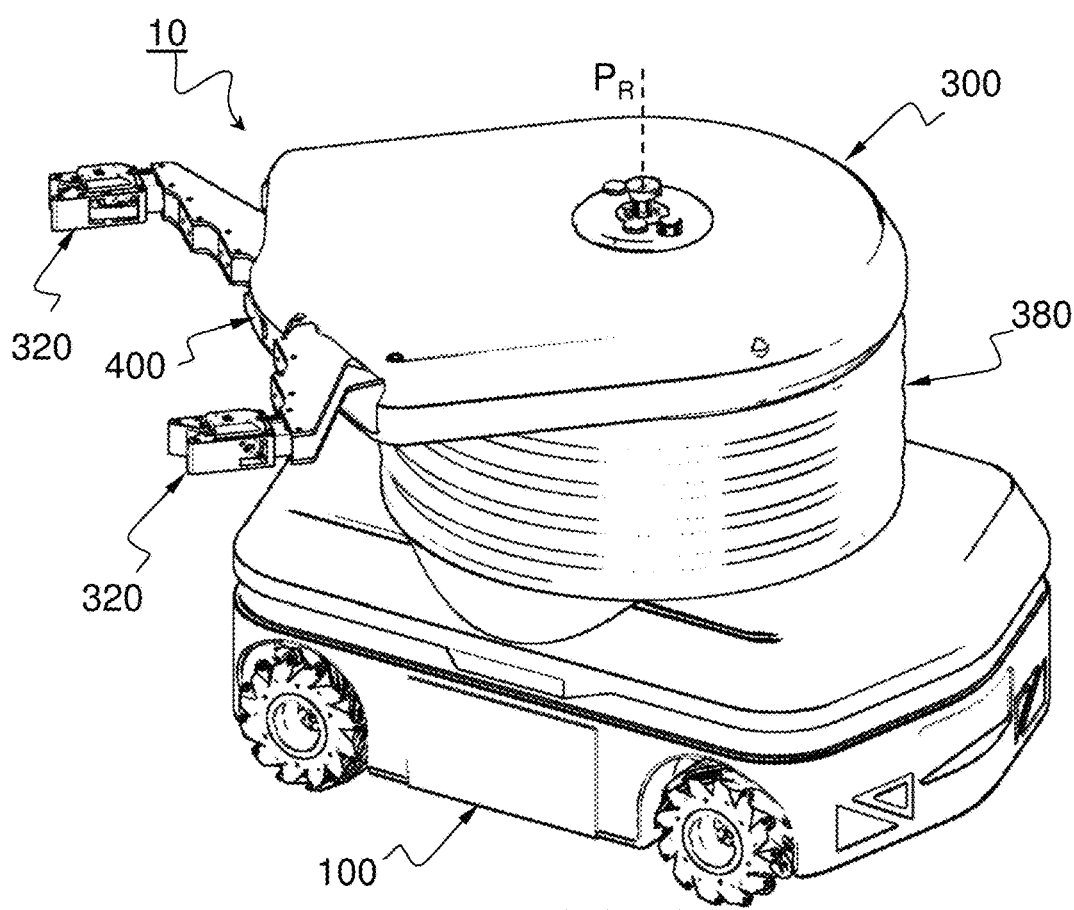
FIG. 19 is a side perspective view of a lifting mechanism (380) of the cart coupling system (300) according to a preferred embodiment of the present invention in a lowered position.
Figure 20:
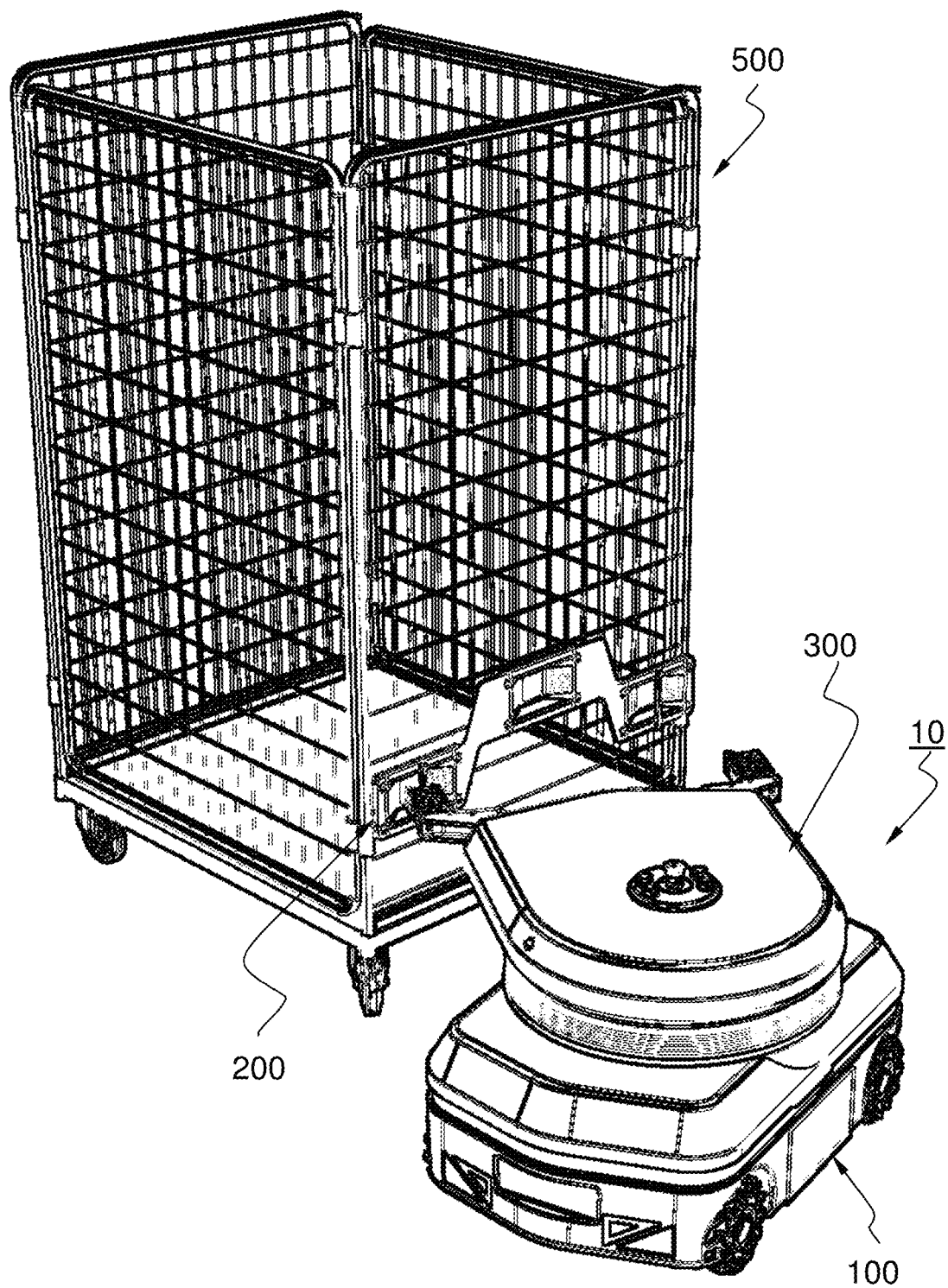
FIG. 20 is a side perspective view of the AMR (10) docking with the coupling structure (200) of the wheeled cart (500) by means of the cart coupling system (300).

In a preferred embodiment the cart coupling system may be mounted on a liftable base, which supports the cart coupling system and components thereof. Advantageously, the liftable base may also support other actuated systems, such as the herein discussed extraction/retraction system, gripper distance system and/or rotating system. The robot arm rotating system may comprise a linear actuator configured for lifting the liftable base and lifting means. Further clarification may be provided with reference to the figures, in particular FIG. 18, which shows the cart coupling system in a lowered position, and FIG. 19, which shows the cart coupling system in a lifted position.

The cart coupling system may comprise a rotating system, which is configured to rotate the cart coupling system relative to the robot body about an axis of rotation, i.e., the rotation axis. The rotating system may rotate the cart coupling system such that the direction of at least one robot arm, preferably all robot arms, and/or at least one gripper hand, preferably all gripper hands, can be changed relative to the robot body. When the rotating system rotates the cart coupling system, a mismatch will occur between the normal of the robot body and the normal of the cart coupling system. The rotating angle $\alpha$ is herein defined as the angle between the cart coupling system and the robot body when rotated by the rotating system. The rotating mechanism is particularly beneficial for situations wherein the cart coupling system is instructed to dock with an improperly parked or difficult to reach wheeled cart, which would be out of reach for the cart coupling system under normal operating conditions.

Figure 17:
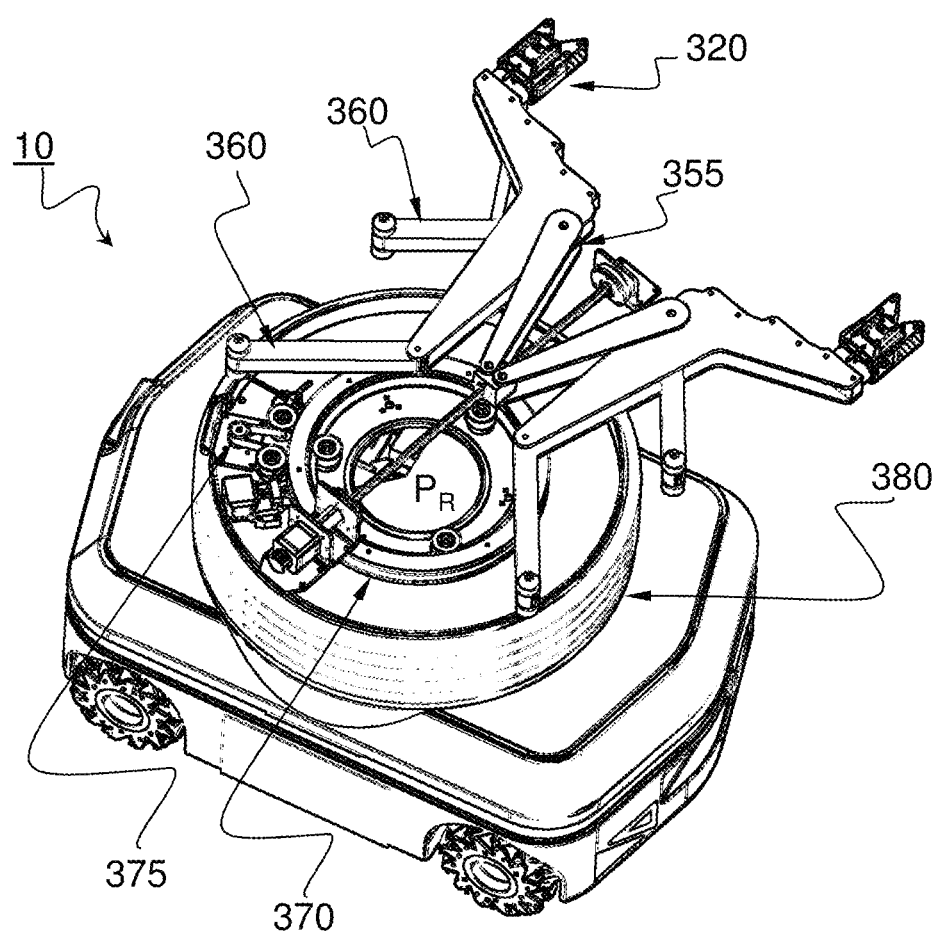
FIG. 17 is a side perspective exploded view of a rotating system (370) of the cart coupling system (300) according to a preferred embodiment of the present invention.

In a preferred embodiment the cart coupling system may be mounted on a rotatable base, such as a turntable, which supports the robot arms of said cart coupling system and is arranged to rotate about the rotation axis. Advantageously, the rotatable base may also support other actuated systems, such as the herein discussed extraction/retraction system, gripper distance system and/or lifting system. The rotating system may comprise a rotary actuator configured for rotating the rotatable base and rotating means, such as one or more gears, rings, belts, bearings, and the like, for enabling the rotating motion of said rotatable base. Further clarification may be provided with reference to the figures, in particular FIG. 17.

The cart coupling system can be rotated to ensure an optimal docking angle with the wheeled cart. During docking the coupling system can be rotated to any rotating angle α relative to the robot body, for example, from 0°, i.e., the normal driving direction of the AMR, up to 360°, i.e., a full rotation. Once the rotating angle α has been set, the rotating system may be locked in place by a locking mechanism, such as a holding torque. During normal driving of the AMR, the rotating system may be locked by a spring-loaded latch. Accordingly, the rotating system may be set to a position-controlled mode or a torque-controlled mode. The inventors found that a combination of omnidirectional wheels and the rotating system may enable the cart coupling system to dock with wheeled carts in positions that would be out of reach for systems of the art. Nonetheless, the provision of a rotating system may reduce the docking accuracy due to a potential mismatch between the cart coupling system and the robot body, which can be solved by the provision of a docking control system as described below.

The AMR may comprise a docking control system configured for docking of the AMR with the wheeled cart; preferably of at least one gripper hand of the cart coupling system with at least one gripping element of the cart coupling structure. The docking control system can be combined with or integrated into other AMR technology, such as the optical units of the mobile drive unit. For example, the AMR may first identify the gross position of a cart using the optical unit and approach it to a suitable distance. Once it is within or near docking range, it may activate the docking control system to improve the accuracy and speed of docking. Hence, the skilled person may thus appreciate that the herein discussed docking control system may also be regarded as supplementary technology available to state of art AMR control systems rather than a replacement thereof.

The docking control system may be configured to track the position of at least three reference points and a rotating angle α; wherein the reference points include
- a first reference point positioned along a first axis running through at least two coupling elements of the coupling structure, preferably reference point $P_{GE}$ running through at least two gripping elements of the coupling structure;
- a second reference point $P_{GH}$ positioned along a second axis running through the cart coupling means of the cart coupling system, preferably reference point $P_{GH}$ running through at least two gripping hands of the cart coupling system;
- a third reference point positioned on the robot body, preferably reference point $P_R$ positioned on the rotation axis of the above-discussed rotating system; and wherein
- the angle α is defined as the angle between the cart coupling system and a robot body when rotating with the rotating system.

Further, the docking control system may be configured to determine, from changes in the position of at least one tracked reference point and/or the rotating angle α, a docking correction factor for adjusting an orientation of the AMR, a movement of the robot body and/or a rotation of the cart coupling system. The docking control system may comprise a docking control unit which is configured to calculate said docking correction factor. The docking correction factor may for example include a determination of the angle mismatch between the cart coupling system of the AMR and the coupling structure of the wheeled cart.

The docking control system, preferably the docking control unit, may be operatively connected to the mobile drive unit of the robot body, such that it may steer the movement of said robot body to improve the docking. Alternatively, the docking control system may be configured to provide the mobile drive unit with instructions which are subsequently effectuated by the mobile drive unit. For example, the docking control unit may be configured to determine the movement correction factor whereas the mobile drive unit may determine, from the movement correction factor, the necessary positional adjustments.

The docking control system, preferably the docking control unit, may be operatively connected to the actuated systems of the cart coupling system, such as the herein discussed extraction/retraction system, gripper distance system and/or rotating system, such that is may likewise steer the movement of said cart coupling system to improve the docking. For example, the docking control unit may be configured to determine a docking correction factor that includes a gripper hand distance D mismatch and subsequently adjust the distance between the gripper hands to correspond with the distance between the gripping elements. For example, the docking control unit may be configured to determine a docking correction factor that includes a rotating angle α mismatch between a gripper hand and a gripping element; the rotating system may rotate the cart coupling system to align the gripper hands with the gripping element.

The AMR may comprise an orientation control system configured for determining an orientation of the herein described AMR, preferably of the herein described cart coupling system, relative to the herein described wheeled cart, preferably the herein described cart coupling structure. The orientation system may be configured to determine said AMR orientation by means of the above-described reflector unit or any embodiment thereof. The orientation system can be combined with or integrated into other AMR technology, such as the optical units of the mobile drive unit. For example, the AMR may first identify the gross position of a cart using the optical unit and approach it to a suitable distance. Once it is within or near docking range, it may activate the orientation control system to improve the accuracy and speed of docking. Hence, the skilled person may thus appreciate that the present invention can also be regarded as supplementary technology available to state of art AMR control system rather than a replacement thereof.

The orientation control system may comprise at least one broadband light emitter and at least one narrowband light sensor. The broadband light emitter may for example be configured to emit light containing at least three distinct wavelengths or wavelength ranges. The narrowband light sensor may accordingly be configured to record light corresponding to at least one of said three distinct wavelengths or wavelength ranges after selective reflection by the reflector unit. In a preferred embodiment the broadband light is light within the infrared frequency range.

Additionally, the narrowband light sensor may be configured to record light corresponding to an array of wavelengths or wavelength ranges, each array being associated by the AMR orientation control unit with an AMR orientation as described above. Advantageously, each array may include at least two distinct wavelengths or wavelength ranges, for example three wavelengths or wavelength ranges, which are associated by the AMR orientation control unit with an AMR orientation. This may provide a redundant system that is resilient to the existence of cross-over wavelengths from surrounding light sources. In a preferred embodiment, the reflector unit is configured to selectively reflect light in at least 3*n-sets of wavelengths or wavelength ranges, wherein n is a natural number, each n-set of the wavelengths or wavelength ranges being associated by the AMR orientation control unit with an AMR orientation; said AMR orientation including at least a centred orientation, a right orientation and a left orientation.

The orientation control system may comprise a light intensity sensor. Advantageously, the narrowband light sensor may be configured to record the light intensity of the light corresponding to at least one of said three distinct wavelengths or wavelength ranges. Typically, the intensity of the incident narrowband light on the narrowband light sensor may be at its highest when the reflected incident light is normal to the surface of the narrow band light sensor. The intensity of the incident narrowband may thus serve as a control signal. The orientation control unit may provide a control signal to the AMR relative to the intensity and the determined AMR orientation, for example, by using the intensity of the incident reflected light as a control signal to arrive at normal with the reflection unit.

Data emitted and recorded by the light emitter and light sensor, respectively, may be tracked and controlled by the AMR orientation control unit, which is configured for determination of the AMR orientation from the recorded data. In particular, the AMR orientation control unit may be configured to determine, from the wavelength and/or intensity of the reflected light recorded by the narrowband light sensor, an orientation of the AMR relative to the wheeled cart. In particular, the determination may include a determination of at least three orientations of the AMR relative to the wheeled cart: a centred orientation (the cart is positioned in front of the AMR), a left orientation (the cart is positioned on the left side of the AMR) and a right orientation (the cart is positioned on the right side of the AMR). Movement of the AMR relative the approximate cart position while continuously monitoring or regularly determining the orientation may allow the AMR to position itself in the most suitable orientation for docking, which is preferably the centred orientation.

Further, the AMR orientation control unit may be configured to calculate, from the determined orientation, an orientation correction factor for positioning the AMR in the centred orientation. The orientation correction factor may include a determination of the angle mismatch between the AMR and the wheeled cart. In particular, the angle difference between the left or right orientation relative to the centred orientation. The angle difference may be used to calculate the necessary movement adjustment of the AMR to further speed up the docking process.

The AMR orientation control unit may be operatively connected to the mobile drive unit, or it may be configured to provide the mobile drive unit with instructions which are effectuated by the mobile drive unit. For example, the AMR orientation control unit may be configured to determine the movement correction factor whereas the mobile drive unit may determine, from the movement correction factor, the necessary positional adjustments. In a particular embodiment the AMR orientation control unit and the mobile drive unit may be part of a single AMR control unit.

The orientation control system may be configured to modulate the emitted light with a modulation signal and to record light carrying the unique modulation signal and/or filter light without the modulation signal. In a preferred embodiment, the modulation signal may be a pulse-width modulation. The provision of a modulated signal allows for distinguishing the emitted light from other light sources upon reflection. In a preferred embodiment, the light may be modulated using a hardware digital signal processor such that upon emission, each wavelength carries a unique signature.

A further aspect of the present invention relates to a method for docking of the herein described AMR with the herein described wheeled cart; preferably by means of the herein described cart coupling system.

The method may comprise the steps of:
(i) pushing a gripping element against at least two pivotable gripper members of a gripper hand, which are biased by a gripper biasing member towards an open position of said gripper hand, such that said gripper members pivot around said gripping element into a closed position of said gripper hand, thereby tensioning said gripper biasing member; and,
(ii) pushing a moveably arranged latch, which is biased by latch biasing member towards the gripper members, against said gripper members, thereby locking said gripper biasing member in the closed position of said gripper hand; and optionally,
(iii) detecting, with a proximity sensor, the presence of the gripping element within the gripper hand and preventing the latch from unlocking the gripper members upon detection of the presence of said gripping element.

A further aspect of the present invention relates to a, preferably computer-implemented, method for tracking an orientation and/or movement of the herein described AMR, preferably the herein described cart coupling system, relative to the herein described wheeled cart, preferably the herein described cart coupling structure. It is understood that a processing unit of the herein described AMR, for example the docking control unit, may be configured to perform the method as described herein or any embodiment thereof. The processing unit may also be provided with a computer program comprising instructions which, when executed by said computing unit, may cause the processing unit to carry out the steps of the method as described herein. The computer implementation of the described methods may thereby increase the efficiency of the present system.

The method may comprise the steps:
tracking a position of a first reference point $P_{GE}$ positioned along a first axis running through at least two gripping elements of a coupling structure;
tracking a position of a second reference point $P_{GH}$ positioned along a second axis running through the at least two gripper hands of a cart coupling system;
tracking a position of a third reference point $P_R$ positioned on the rotation axis of a rotating system of the cart coupling system;
tracking a rotating angle $\alpha$, which is defined as the angle between the cart coupling system and a robot body when rotating with the rotating system; and,
determining, from changes in the position of at least one tracked reference point and/or the rotating angle $\alpha$, a docking correction factor for adjusting an orientation and/or movement of the AMR; preferably by adjusting a movement of the robot body and/or a rotation of the cart coupling system.

The method may further comprise:
determining a distance between at least two coupling elements of the coupling structure; and,
adjusting a distance between at least two coupling means of the cart coupling system to correspond with the distance between the at least two coupling elements.

The method may further comprise:
determining a distance between at least two gripping elements of the coupling structure; and, adjusting a distance D between at least two gripper hands of the cart coupling system to correspond with the determined distance between said gripping elements.

A further aspect of the present invention relates to a, preferably computer-implemented, method for determining an orientation of the herein described AMR, preferably the herein described cart coupling system, relative to the herein described wheeled cart, preferably the herein described cart coupling structure. It is understood that a processing unit of the herein described AMR, preferably the AMR orientation control unit, may be configured to perform the method as described herein or any embodiment thereof. The processing unit may also be provided with a computer program comprising instructions which, when executed by said computing unit, may cause the processing unit to carry out the steps of the method as described herein. The computer implementation of the described methods may thereby increase the efficiency of the system.

The method may comprise the steps:
(a) emitting, from a broadband light emitter, light onto a reflector unit of the coupling structure;
(b) selectively reflecting, with a reflector unit, the emitted light at a specific narrowband wavelength; wherein the narrowband wavelength corresponds with an orientation of the AMR relative to the wheeled cart; preferably by selectively reflecting of light in one of at least three narrowband wavelengths or wavelength ranges, each wavelength or wavelength range being associated with a different orientation of the AMR relative to the wheeled cart;
(c) recording, with a narrowband light sensor, the selectively reflected light;
(d) determining, from the narrowband wavelength and optionally intensity of the recorded light, an orientation of the AMR relative to the wheeled cart; preferably by determining one of one of at least three AMR orientations, said AMR orientations including at least a centred orientation, a right orientation and a left orientation of the AMR relative to the wheeled cart;
(e) determining, from said AMR orientation, an orientation correction factor for adjusting an orientation of the AMR; preferably by adjusting a movement of the robot body and/or a rotation of the cart coupling system; and optionally,
(f) adjusting an orientation of the AMR; preferably by adjusting a movement of the robot body and/or a rotation of the cart coupling system; for example, by adjusting the AMR orientation from a left orientation or a right orientation to a centred orientation of the AMR relative to the to the wheeled cart.

In some embodiments, the methods may be preceded by
(A) determining a gross position of a wheeled cart; and,
(B) approaching the wheeled cart position to a docking range;
wherein the docking range is suitable for performing the herein described method for tracking an orientation and/or movement of the herein described AMR and/or method for determining an orientation of the AMR or an embodiment thereof. The suitable docking range is dependent on the configuration the AMR, such as the range of the AMR's optical unit.

A further aspect of the present invention relates to a use of the AMR as described herein for docking with a wheeled cart. A further aspect of the present invention relates to a use of the cart coupling system as described herein for docking an AMR with a wheeled cart. A further aspect of the present invention relates to a use of the docking control system as described herein for docking an AMR with a wheeled cart. A further aspect of the present invention relates to a use of the orientation control system as described herein for docking an AMR with a wheeled cart.

EXAMPLES

To better illustrate the properties, advantages and features of the present invention some preferred embodiments are disclosed as examples with reference to the enclosed figures. However, the scope of the present invention is by no means limited to the illustrative examples described below.

Example 1: AMR Cart Coupling System

With reference to FIG. 1, an AMR (10) according to a preferred embodiment of the present invention is shown. The AMR (10) comprises a robot body (100) provided with four Mecanum wheels; two in the front and two in the rear. The Mecanum wheels enable omnidirectional movement of the AMR.

The AMR also comprises two robot arms (310) that extend from the front of the robot body. Each robot arm (310) is provided with a gripper hand (320) mounted on an end of said robot arm (310). The robot arm (310) and gripper hand (320) are part of the cart coupling system (300) for coupling the AMR with a coupling structure (200) of a wheeled cart (50), which is discussed further in Example 2 below.

Figure 2:
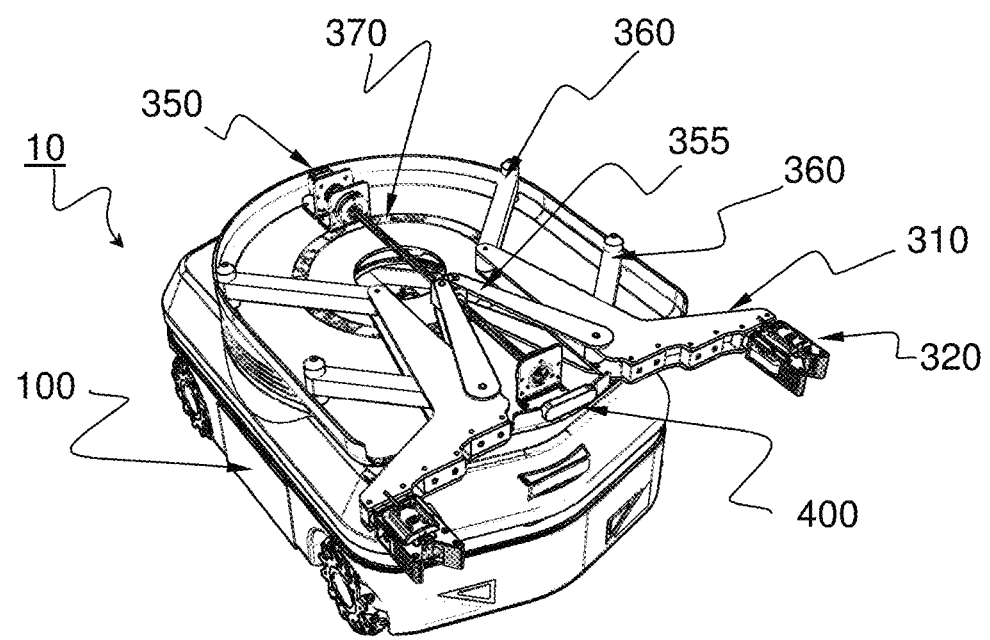
FIG. 2 is a perspective view of the AMR (10), whereby a top part of the robot housing is removed to expose a cart coupling system (300).
Figure 3:
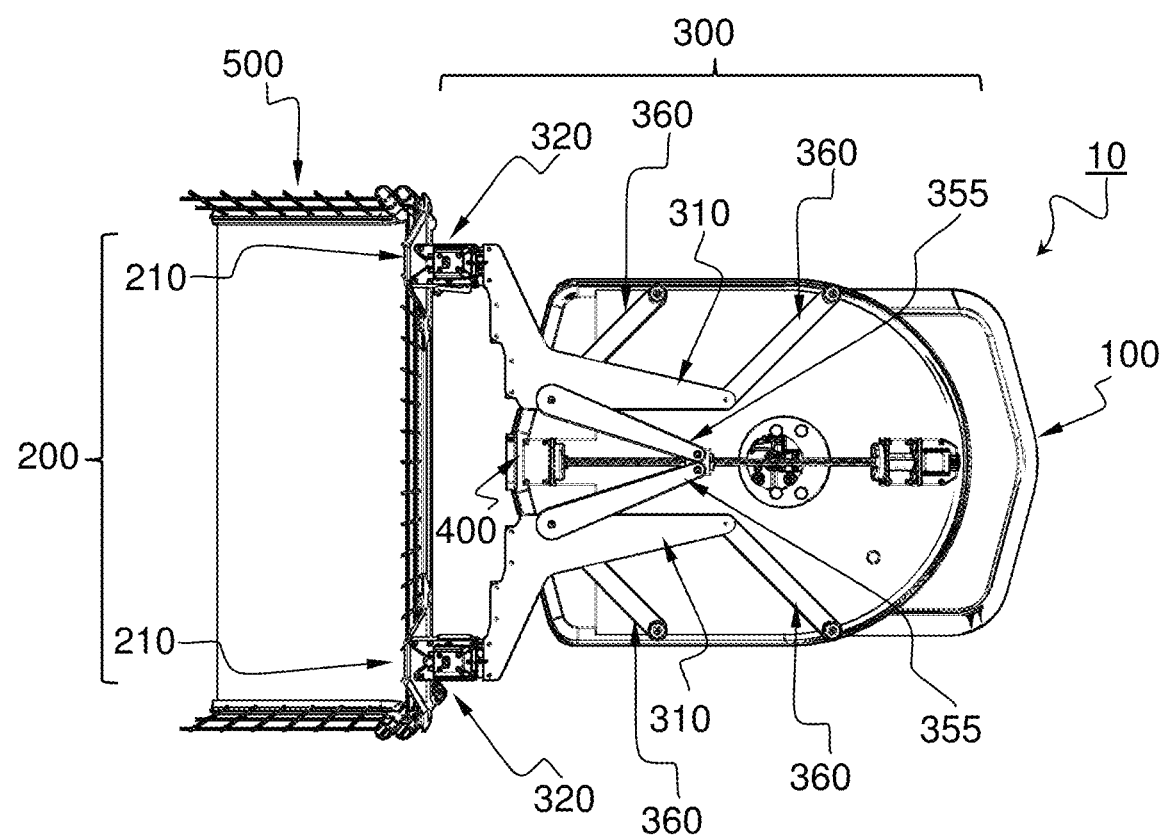
FIG. 3 is a top view of the AMR (10) docking with a wheeled cart (500) by means of the cart coupling system (300).
Figure 4:
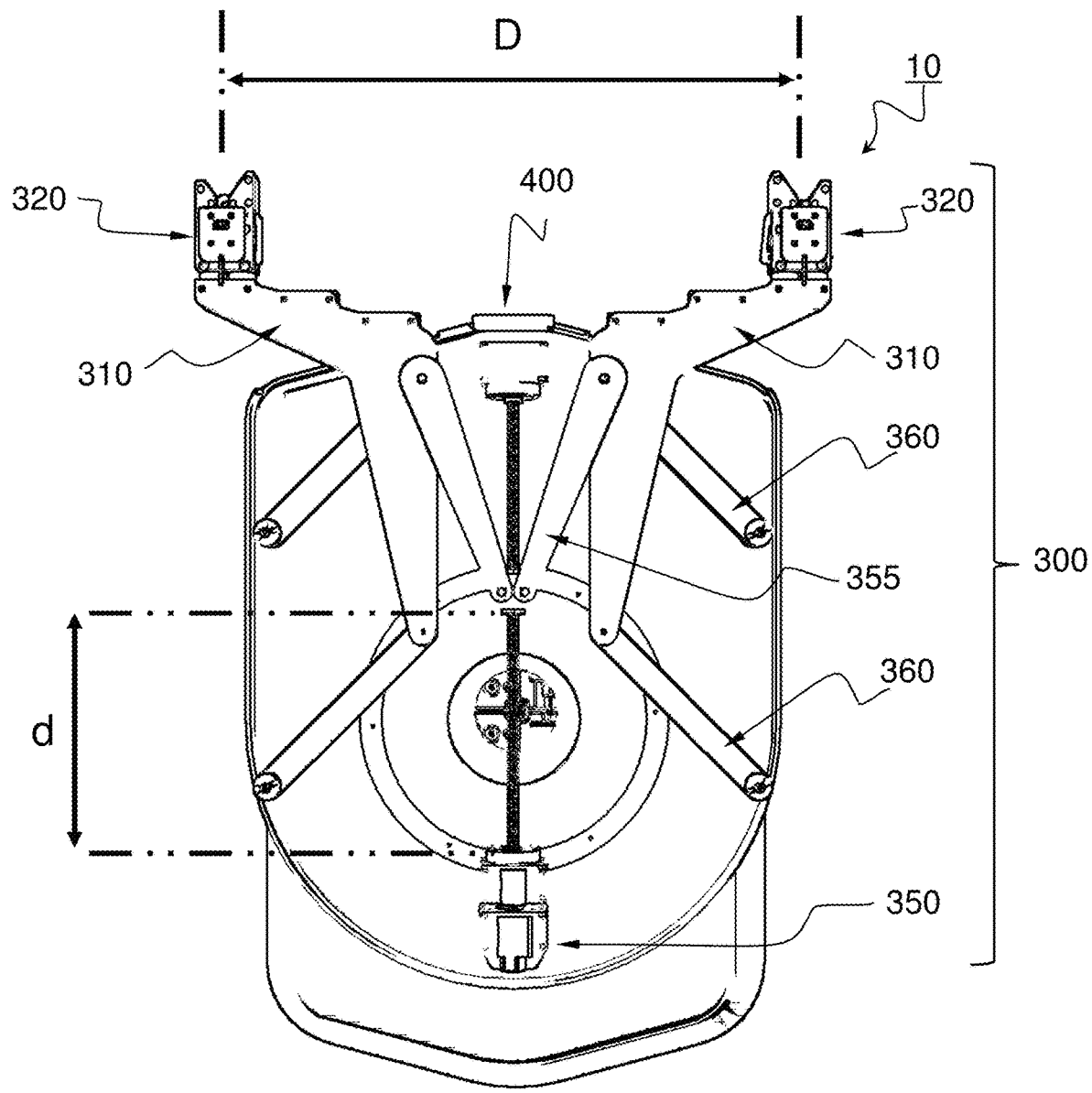
FIG. 4 is a detailed view of an extension/retraction system of the cart coupling system (300) according to a preferred embodiment of the invention.

The cart coupling system (300) is shown in greater detail in FIGS. 2 to 4, which illustrate the AMR (10) with a top part of the robot housing removed. The cart coupling system (300) comprises two robot arms (310) which are each mechanically connected to two swing joints (360). The robot arm (310) is pivotably connected to the two extension members at two positions; in particular, at the end opposite of the gripper hand and another point distant from the end. The swing joints (360) are arranged laterally to the robot arm (310) position i.e., at a lateral edge centre of the robot body (100). Each swing joint (360) is at one end pivotably connected to said robot arm (310) and at the other end rotatably connected to the robot body (100), such that it can rotate in a horizontal plane, i.e., parallel to the robot body (100) surface.

Further, the robot arms (310) are each connected to a single connective joint (355). The robot arm (310) is also pivotably connected to the two single connective joints (355). The connective joint (355) is arranged centrally to the robot arm (310) position, i.e., in the centre of the robot body (100).

Movement of the robot arms (310) is effectuated by means of a robot arm actuator (350) disposed in the rear of the robot body. The robot arm actuator (350) is a linear actuator that is configured to simultaneously drives the two connective joints (355), each connected to a separate robot arm (310) from the front to the rear of the robot body and reverse. Movement of the robot arm connective joint (355) will pull or push each robot arms in the direction of the corresponding movement. However, due to the herein described arrangement, each robot arm (310) will move along a sideways curved path relative to the robot body (100).

The presented arrangement thereby enables two functionalities of the cart coupling system (300): adjusting e.g. increasing or decreasing the distance between the two gripper hands (320) and extending or retracting the robot arms (310) into the cart coupling system housing.

FIG. 4 illustrates how the distance d between the connective joint (355) and the robot arm actuator (350) determines the distance D between the two gripper hands (320). This distance D corresponds to the distance between the two gripping elements (220) and given the symmetrical configuration D/2 will also correspond with the centre of the AMR (10).

Further movement of the robot arm connective joint (355) towards the rear of the robot will translate into a simultaneous retraction of the robot arms (310) into the robot body. Reverse movement will then cause a simultaneous extension of the robot arms (310) from the robot body. This common connection thus ensures that the two robot arms (310) are always extended and/or retracted together. Similarly, FIG. 4 illustrates how the distance d between the robot arm connective joint (355) and the robot arm actuator (350) determines the position of the two robot arms (310) relative to robot body (100).

Figure 5:
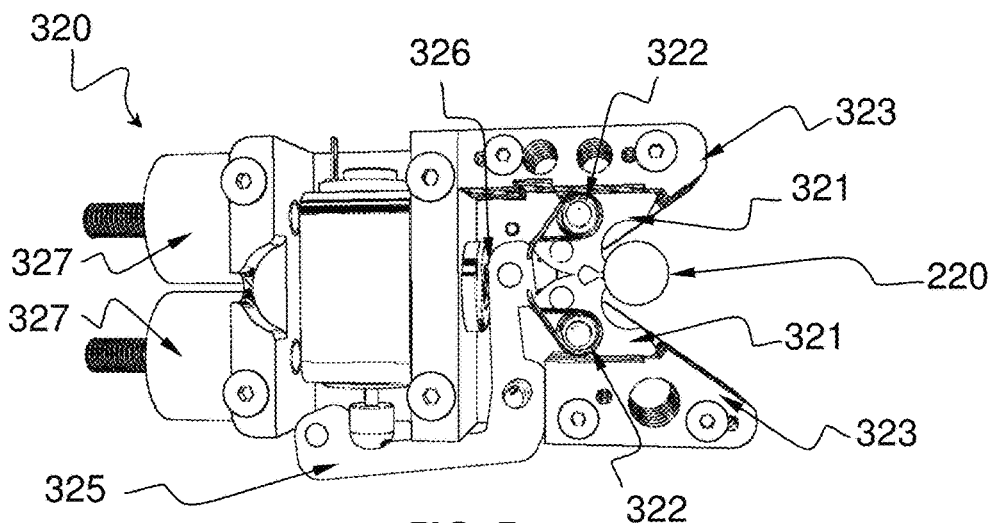
FIG. 5 is a side view of a gripper hand (320) of the cart coupling system (300) in an open position.
Figure 6:
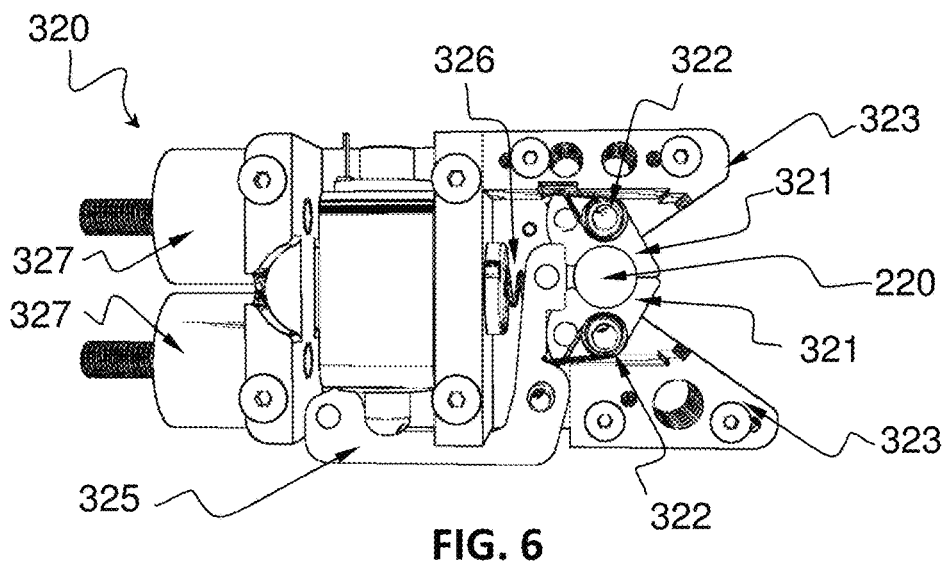
FIG. 6 is a side view of a gripper hand (320) of the cart coupling system (300) in a closed position.
Figure 7:
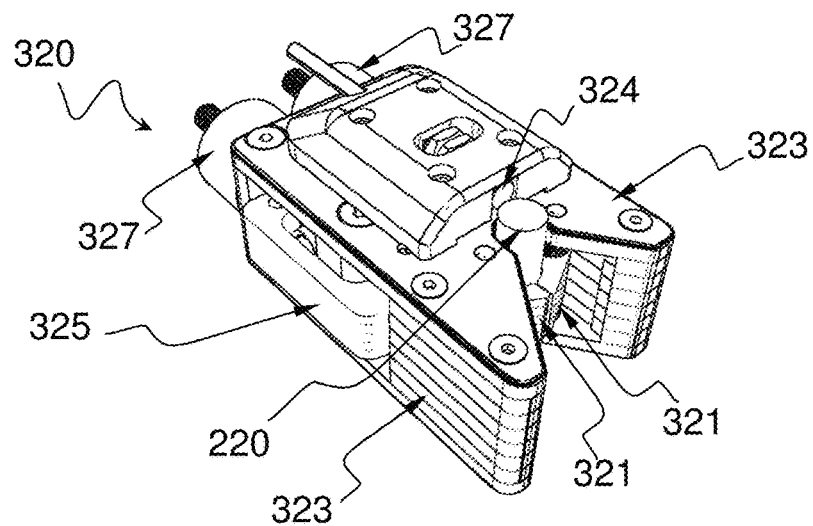
FIG. 7 is a side perspective view of the gripper hand (320) in a closed position.

The gripper hand (320) is shown in greater detail in FIGS. 5 to 7. In particular, the gripper hand (320) comprises two pivotable gripper members (321) which arranged to pivot between an open position, as shown in FIG. 5, and a closed position, as shown in FIG. 6. The gripper members (321) are biased by gripper biasing member (322) towards the open position of said gripper hand (320). The gripper biasing member (322) will thus be tensioned in the closed position of the gripper hand (320).

Further, gripper hand (320) comprises a moveably arranged latch (325), which is arranged to lock said gripper members (321) in the closed position. The moveably arranged latch (325) is biased by a latch biasing member (326) towards the gripper members (321). The rear end of each gripper members (321) is provided with curved notch, which when the gripper members (321) pivot into the closed position, align to form a slot that has a size corresponding with the front end of the latch (325). The latch (325) is spring-loaded to move into the slot formed by movement of the gripper members (321) into the closed position. A latch actuator (325), upon a command from the AMR docking control system, drives back the latch (325), which unlocks the locked gripper members (321) to pivot to the open position and release the gripping element. The latch actuator also tensions the latch biasing member (326) in preparation for the next docking.

Additionally, the gripper hand (320) comprises a proximity sensor (324) which is configured for detecting the presence of a gripping element (220) between the gripper members (321). The proximity sensor (324) is operatively connected to the latch actuator and prevents it from unlocking the latch (325) and consequently also the gripper members (321) if a gripping element (220) is detected.

Additionally, the gripper hand (320) comprises a guiding structure (323) extending from the gripper members (321). The guiding structure (323) has a broad entry point tapered towards the gripper members (321) at an angle of 75°. The guiding structure (323) thereby guides the gripping element (220) towards the gripper members (321) during docking.

Additionally, the gripper hand (320) comprises damping member (327) disposed between the robot arm (310) and the gripper hand (320). The damping member (327) may dampen forces exerted on said gripper hand (320) during docking.

Example 2: AMR Orientation Control System

The AMR (10) is provided with an orientation control system (400) which is configured for determining an orientation of the AMR (10) relative to the wheeled cart (500). The determination of the AMR (10) can be established once the AMR (10) has determined the gross position of the wheeled cart, for example by means of an optical unit of the robot body (100) and approached it to position itself for docking. The orientation control system (400) determines the AMR (10) orientation by interacting with reflector units (240) provided on the coupling structure (200) on said wheeled cart (500), which are discussed first below.

Figure 8:
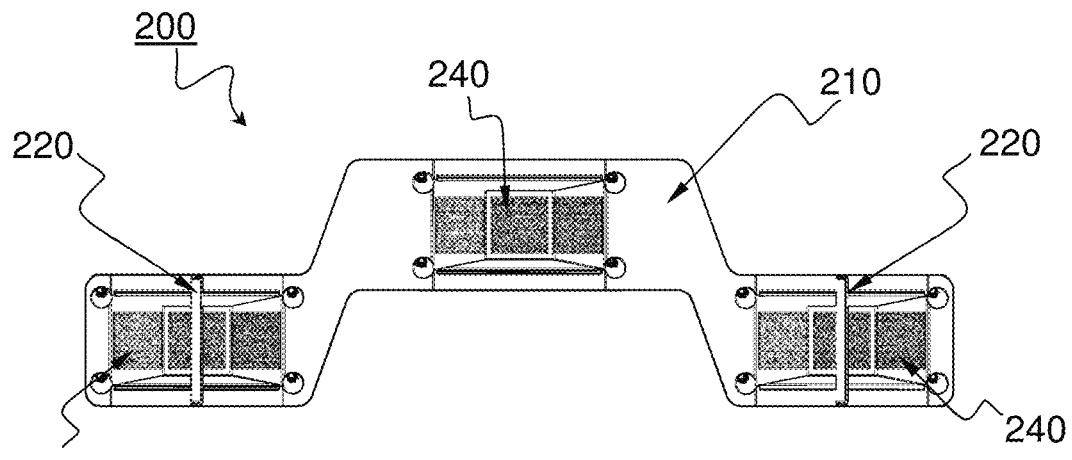
FIG. 8 is a front view of a coupling structure (200) for the wheeled cart (500) according to a preferred embodiment of the invention.
Figure 9:
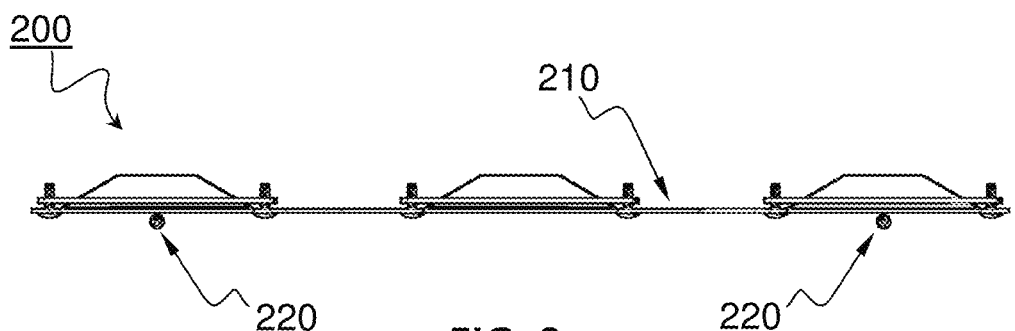
FIG. 9 is a top view of the coupling structure (200).
Figure 10:
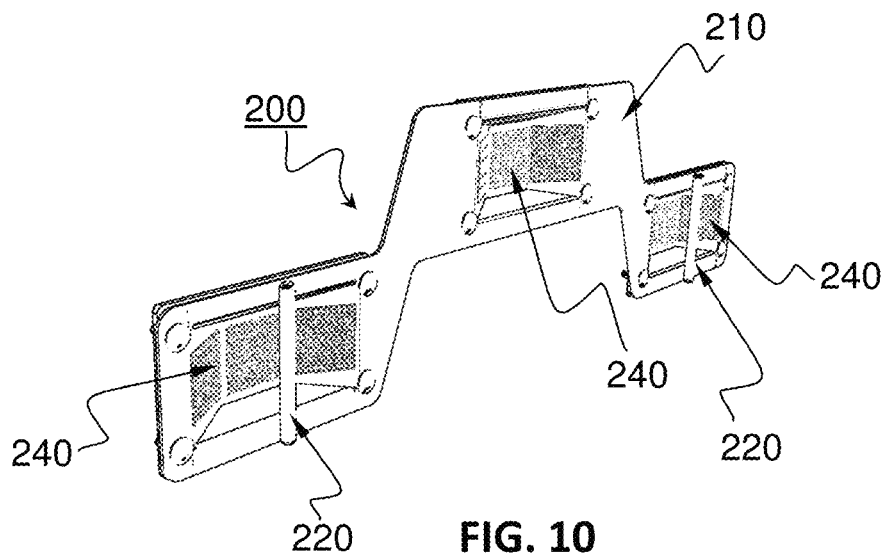
FIG. 10 is a side perspective view of the coupling structure (200).

With reference to FIG. 8, a front view of coupling structure (200) of a wheeled cart (50) is shown. FIG. 9 is a top view of the same coupling structure (200) and FIG. 10 is a perspective view thereof. The coupling structure (200) comprises a frame hitch having three planar structures divided into a central structure and two side structure. The central structure is arranged at an elevated position in comparison to the two proximal structures, which are referred to as the left structure and the right structure.

Both the left and right structure are provided with a vertical gripping element (220), which can for example be gripped by the gripper hand (320) of Example 1 above. The coupling structure (200) thus comprises two gripping elements (220). Each gripping element (220) is disposed at the same distance from the central structure. Reflector units (240) are provided behind each of the two gripping elements (220) and also on the central elevated structure.

Each reflector units (240) comprises three reflectors including a central reflector and two side reflectors. The central reflector is arranged in-line with the frame hitch surface. The two side reflectors are each arranged at opposite sides of the central reflector and disposed at an angle β towards the central reflector. The angle β is shown on FIG. 12A. Each reflector is configured to selectively reflect light in a different wavelength or wavelength range. For example, FIG. 12B illustrates that the central reflector selectively reflects light with wavelength A, the left reflector selectively reflects light with wavelength B and the right reflector selectively reflects light with wavelength C. As a result of this reflector unit configuration, the wavelength or wavelength range of the reflected incident light will indicate which one of the three reflectors reflected the incident light and hence be indicative of the angle between the incident broadband light and the frame hitch.

The selective reflecting may be performed by the provision of a filter that filters out the wavelength emitted by the broadband light emitter (410) except for the wavelength or wavelength range that is to be selectively reflected. The selected wavelength or wavelength range will pass through the filter and be reflected by a mirror coating provided on the surface of the reflector. An example is provided in FIG. 11.

Figure 13:
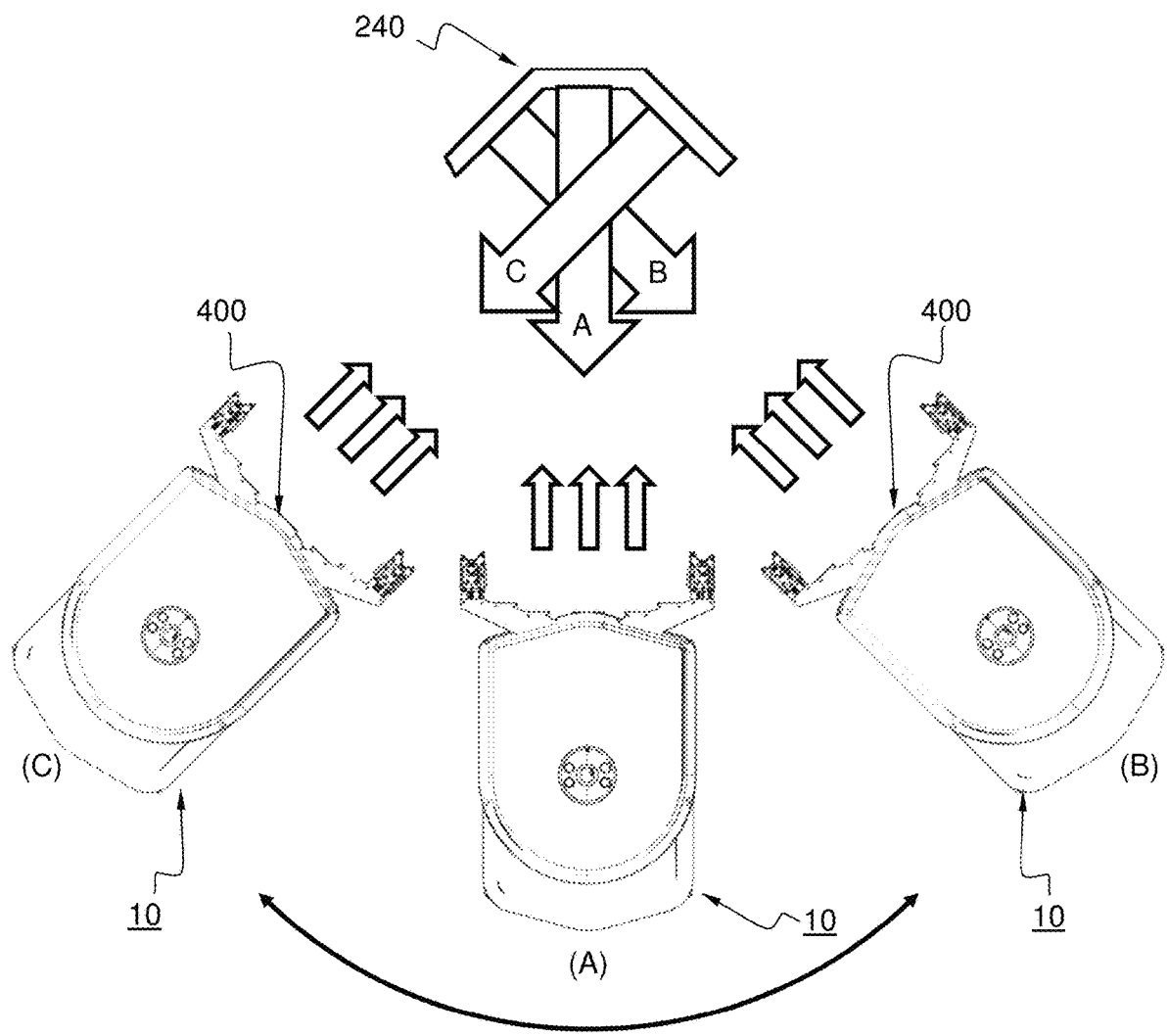
FIG. 13 is a working principle of the AMR orientation control system according to a preferred embodiment of the present invention.

The interaction of the reflector unit (240) with the orientation control system (400) is discussed further with reference to FIG. 13. The AMR (10) will determine a gross position of the wheeled cart and approach it to position itself for docking. Once the wheeled cart is determined to be in range the AMR (10) will switch on the orientation control system (400) and start emitting light in the approximate direction of the AMR (10) from a broadband light emitter (410). For example, as illustrated in FIG. 13, the emitted broadband light has a wavelength range comprising at least wavelengths A, B and C. The emitted broadband light will reach a reflector unit (240) which has the configuration discussed with reference to FIG. 12B. As a result, this reflector unit (240) will selectively reflect the light emitted by the AMR as narrowband light having either wavelength A, B or C, depending on which one of the three reflectors (i.e., the central, left or right reflector), reflects the emitted light. The reflected narrowband light will then be recorded by the narrowband light sensor (420) of the AMR (10).

The AMR orientation control unit will receive the data recorded by the narrowband light sensor (420) and determine from the recorded data an orientation of the AMR (10) relative to the reflector unit (240) and hence the wheeled cart (500). For example, the AMR orientation control unit may be provided with reference data which associates the recorded wavelengths A, B and C with a right (A), central (B) and left (C) orientation, respectively. Based on the determined AMR orientation, the position of the AMR (10) may be adjusted by moving the robot body (100) to a preferred docking position; for example, centrally (B) in front of the wheeled cart (500).

Example 3: AMR Docking Control System

The docking of the AMR (10) with the cart is discussed with reference to FIGS. 14 to 16. The cart docking can be performed once the AMR (10) has determined the gross position of the wheeled cart, for example by means of an optical unit of the robot body (100) and approached it to position itself for docking. Advantageously, the docking is performed after determining the orientation of the AMR (10) relative to the wheeled cart (500), for example by means of the orientation control system discussed in Example 2, and adjusting the AMR (10) to a preferred docking position. The docking is performed by coupling of the griper hands (320) of the cart coupling system (300) with a coupling element (220) on the coupling structure (200), as discussed in Example 1.

Once the AMR activates the docking control system, it will selectively start tracking the position of three reference points. These three references points include $P_{GE}$, which is positioned along an axis running through the left gripping element $L_{GE}$ and the right gripping element $R_{GE}$; $P_{GH}$, which is positioned along an axis running through the left gripper hand $L_{GH}$ and the right gripper hand $R_{GH}$; and $P_R$, which is positioned on the rotation axis of the rotating system (370) of the cart coupling system (300). Also, the docking control system will track the position of the rotating angle $\alpha$, which is defined as the angle between the cart coupling system (300) and the robot body (100) when rotating with the rotating system (370). When the cart coupling system (300) is aligned with the robot body (100) the rotating angle $\alpha$ will equal 0, as shown in FIG. 16. However, when the cart coupling system (300) is rotated relative to the robot body (100), the rotating angle $\alpha$ will fall between $0°<\alpha<360°$; for example, in FIG. 15 the rotating angle $\alpha$ equals ±45°.

Further, the docking control system may determine a docking correction factor from changes in the position of any one of $P_{GE}$, $P_{GH}$ and $P_R$ and/or the value of the rotating angle $\alpha$. The docking correction factor may subsequently be used to calculate adjustments to the position of the AMR (10), a movement of the robot body (100) and/or a rotation of the cart coupling system (300) to improve the docking. Below two exemplary scenarios for the docking control system are presented.

Figure 14:
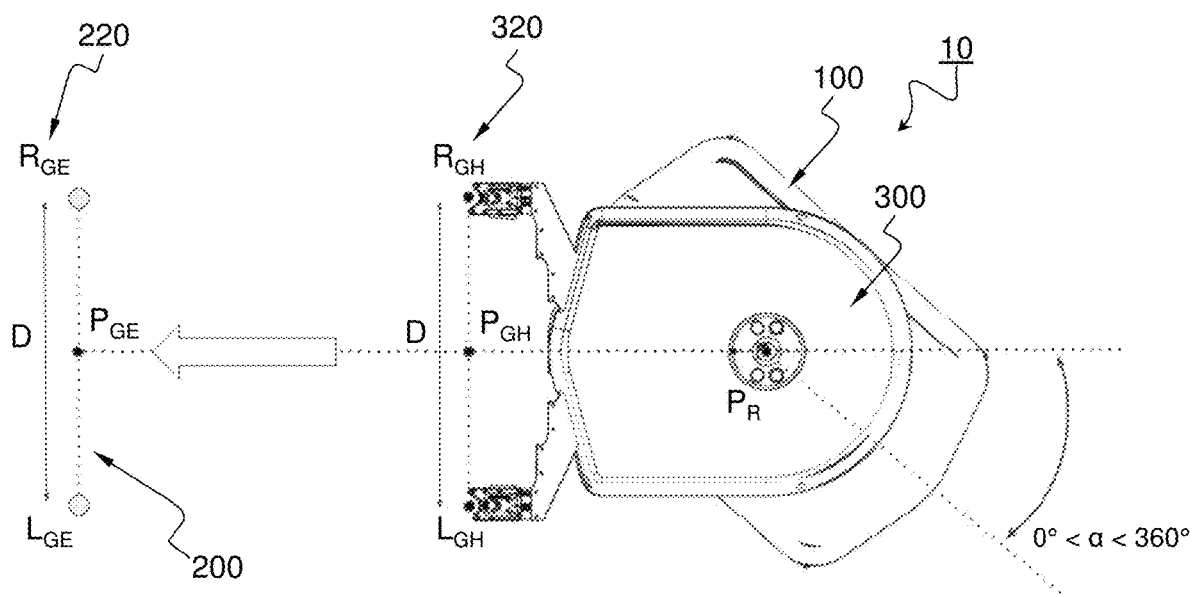
FIG. 14 is a working principle of the AMR docking control system according to a preferred embodiment of the present invention.

FIG. 14 illustrates a first exemplary scenario wherein the tracking by the docking control system is performed along an AMR movement path wherein the gripper hands $L_{GH}$ and $R_{GH}$ are aligned with the corresponding gripping elements $L_G$ and $R_{GE}$, respectively. The reference points for this scenario will include point $P_{GE}$, which is positioned centrally between $R_{GE}$ and $L_{GE}$, point $P_G$, positioned centrally between the $R_G$ and $L_G$, and point $P_R$. Rotating angle $\alpha$, however, equals ±45°. As such, the docking control system may instruct the AMR (10) to first align the robot body with the docking control system such that $\alpha=0°$ and then move straight forward to dock with the wheeled cart.

Figure 15:
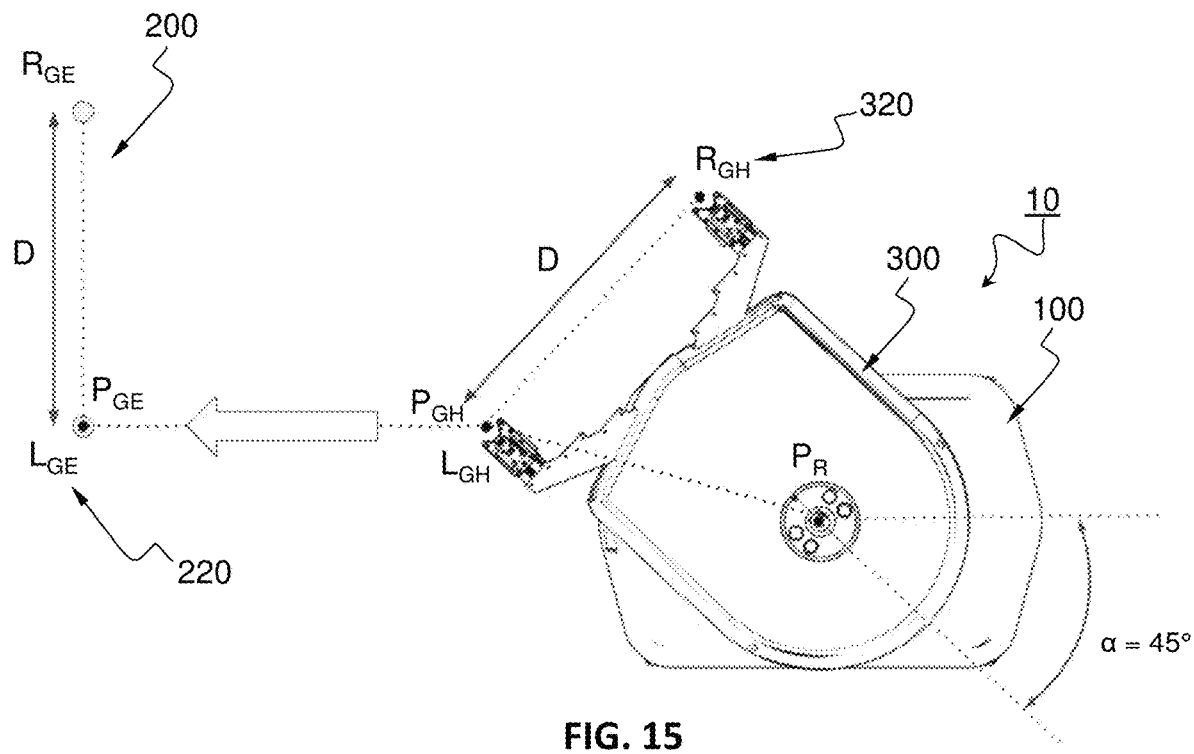
FIG. 15 is a working principle of the AMR docking control system.
Figure 16:
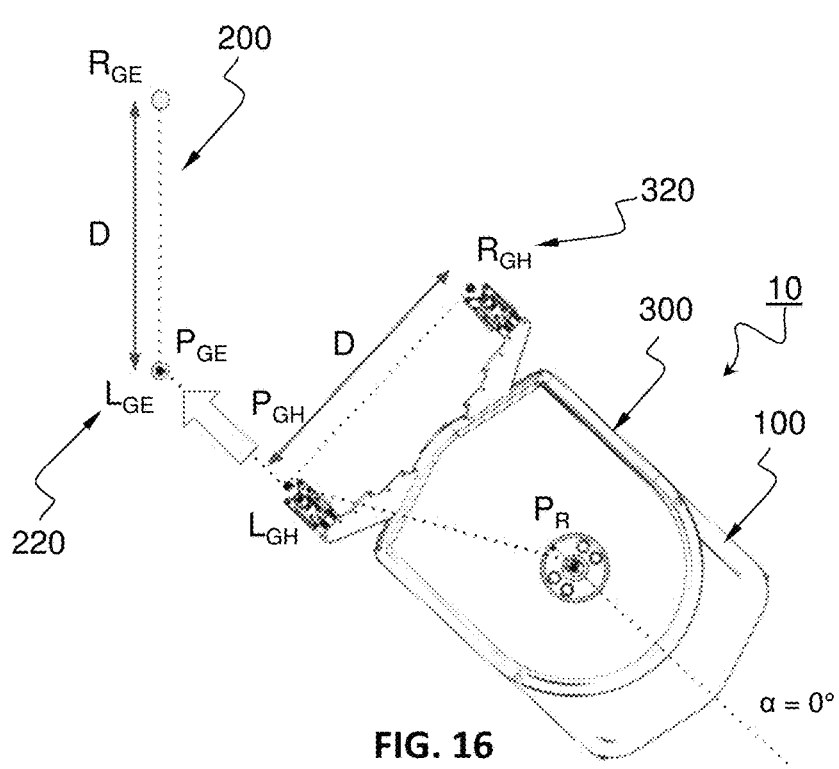
FIG. 16 is a working principle of the AMR docking control system.

FIG. 15 illustrates a second exemplary scenario wherein the tracking by the docking control system is performed along an AMR movement path wherein gripper hand $L_{GH}$ is aligned with gripping element $L_{GE}$, but $R_{GH}$ is not aligned with gripping element $R_{GE}$. The reference points in this scenario will include point $P_{GE}$, which corresponds with the position of $L_{GE}$, point $P_{GH}$, which corresponds with the position of $L_{GH}$, and point $P_R$. Also, rotating angle $\alpha$ equals ±45°. As such, the docking control system may instruct the AMR (10) to approach at an angle of ±45° to the normal perpendicular to the coupling structure (200) to dock with the wheeled cart (500).

What is claimed is:

1. An autonomous mobile robot (AMR) system for docking with a wheeled cart; the wheeled cart being provided with a coupling structure comprising:
   a frame hitch;
   at least two elongated grips, which are disposed equidistant from a center of the frame hitch; and
   the AMR comprising:
   a robot body comprising at least one optical unit, a driving system configured for moving said robot body, and a mobile drive unit configured for automated navigation of said robot body;
   a cart coupling system comprising at least two robot arms extending from said robot body, each robot arm comprising at least one gripper hand configured for gripping of at least one gripping element;
   wherein each gripper hand comprises
   at least two pivotable grippers, which are arranged to pivot between an open and a closed position of said gripper hand;
   a gripper bias for biasing said grippers towards the open position of said gripper hand;
   a moveably arranged latch, which is arranged to lock said grippers in the closed position of said gripper hand; and,
   a latch bias for biasing said latch towards said grippers.

2. The AMR system of claim 1, wherein the gripper hand further comprises a proximity sensor configured for detecting the presence of the grip within the gripper hand; wherein the proximity sensor is operatively connected to the latch and configured to prevent the latch from unlocking the grippers upon detection of the presence of said grip.

3. The AMR system of claim 1, wherein the gripper hand further comprises a guiding structure extending from the grippers, which is configured to guide the grip towards the grippers.

4. The AMR system of claim 3, wherein the guiding structure has a broader entry tapered towards the grippers at an angle of 45° to 80°.

5. The AMR system of claim 1, wherein the gripper hand further comprises a damping member, disposed between the robot arm and the gripper hand, which is configured to dampen forces exerted on said gripper hand and/or to enable angular adjustments of said gripper hand.

6. The AMR system of claim 1, wherein the robot arm is mechanically connected to at least one central connective joint and at least two lateral swing joints; wherein each joint is at one end pivotably connected to said robot arm and at the other end rotatably connected to the robot body; and wherein the cart coupling system further comprises a robot arm actuator configured to simultaneously drive the connective joints of the at least two robot arms, which translates into a sideways curved motion of said robot arms relative to the robot body, such that the robot arms can be retracted into or extended from the cart coupling system, and/or increase or decrease the distance between the gripper hands on each robot arm.

7. The AMR system of claim 1, further comprising a rotating system, which is configured to rotate the cart coupling system relative to the robot body about a rotation axis, and a docking control system, which is configured to track the position of at least three reference points and a rotating angle α;
  wherein the reference points include a first reference point $P_{GE}$ positioned along a first axis running through the grips, a second reference point $P_{GH}$ positioned along a second axis running through the gripper hands and a third reference point $P_R$ positioned on the rotation axis cart of the rotating system; wherein the rotating angle α is defined as the angle between the cart coupling system and the robot body when rotating with the rotating system; and,
  wherein the docking control system is configured to determine, from changes in the position of at least one tracked reference point and/or the rotating angle α, a docking correction factor for adjusting a movement of the robot body and/or a rotation of the cart coupling system.

8. The AMR system of claim 1, wherein the coupling structure further comprises a reflector unit which is configured to selectively reflect light from a light source;
  wherein the AMR further comprises an orientation control system, which comprises a broadband light emitter, a narrowband light sensor and an orientation control unit operatively connected to the mobile drive unit;
  wherein the orientation control system is configured to:
    emit, from the broadband light emitter, light onto the reflector unit;
    record, with the narrowband light sensor, light selectively reflected by said reflector unit;
    determine, from the wavelength of the recorded light, an orientation of the AMR relative to the wheeled cart; and,
    determine, an orientation correction factor for adjusting an orientation of the AMR which includes adjusting a movement of the robot body and/or a rotation of the cart coupling system.

9. The AMR system of claim 8, wherein the orientation control system is further configured to determine, from the intensity of the recorded light, an orientation of the AMR relative to the wheeled cart.

10. The AMR system of claim 8, wherein the coupling structure further comprises at least two reflectors, each reflector being arranged behind each grip.

11. The AMR system of claim 10, wherein the coupling structure further comprises a central reflector arranged at a center of the frame hitch at an elevated position relative to the other reflectors.

12. The AMR system of claim 8, wherein the reflector further comprises at least three reflectors including a central reflector, a left reflector, and a right reflector; wherein the left and right reflector are each arranged at opposite sides of the central reflector and disposed at an angle β towards the central reflector; wherein each reflector is configured to selectively reflect light in a different wavelength or wavelength range, each wavelength or wavelength range being associated by the orientation control system with a different orientation of the AMR relative to the wheeled cart, said AMR orientations including at least a centered orientation, a right orientation and a left orientation.

13. The AMR system of claim 8, wherein the orientation control system is configured to modulate the light emitted by the broadband light emitter with a modulation signal and to record light corresponding with the modulation signal and/or filter light without the modulation signal.

14. The AMR system of claim 13, wherein said modulation signal includes pulse-width modulation.

15. A method for docking an autonomous mobile robot (AMR) with a wheeled cart; the wheeled cart being provided with a coupling structure comprising:
  a frame hitch;
  at least two elongated grips, which are disposed equidistant from a center of the frame hitch;
  the AMR comprising:
    a robot body comprising at least one optical unit, a driving system configured for moving said robot body, and a mobile drive unit configured for automated navigation of said robot body;
    a cart coupling system comprising at least two robot arms extending from said robot body, each robot arm comprising at least one gripper hand configured for gripping of at least one gripping element;
  wherein each gripper hand comprises
    at least two pivotable grippers, which are arranged to pivot between an open and a closed position of said gripper hand;
    a gripper bias for biasing said grippers towards the open position of said gripper hand;
    a moveably arranged latch, which is arranged to lock said grippers in the closed position of said gripper hand; and,
    a latch bias for biasing said latch towards said grippers,
  wherein the method comprises the steps of:
    (i) pushing the grip against at least two pivotable grippers of the gripper hand, which are biased by a the gripper bias towards an open position of said gripper hand, such that said grippers pivots around said grip into a closed position of said gripper hand, thereby tensioning said gripper bias; and, (ii) pushing the moveably arranged latch, which is biased by latch bias towards the grippers, against said grippers, thereby locking said gripper bias in the closed position of said gripper hand.

16. The method of claim 15, wherein the gripper hand further comprises a proximity sensor configured for detecting the presence of the gripping element within the gripper hand;
  the method further comprising
    (iii) detecting, with a proximity sensor, the presence of the grip within the gripper hand and preventing the latch from unlocking the grippers upon detection of the presence of said grip.

17. The method of claim 15,
  wherein the robot body further comprises a rotating system configured to rotate the cart coupling system relative to the robot body about a rotation axis;
  wherein the method further comprises the steps of:
    (A) tracking a position of a first reference point $P_{GE}$ positioned along a first axis running through at least two grips of the coupling structure;
    (B) tracking a position of a second reference point $P_{GH}$ positioned along a second axis running through the at least two gripper hands of the cart coupling system;
    (C) tracking a position of a third reference point $P_R$ positioned on the rotation axis of the rotating system of the cart coupling system;

(D) tracking a rotating angle α, which is defined as the angle between the cart coupling system and the robot body when rotating with the rotating system; and, (E) determining, from changes in the position of at least one tracked reference point and/or the rotating angle α, a docking correction factor for adjusting a movement of the robot body or the rotation of the cart coupling system, or a combination thereof;

wherein the steps of (A)-(E) are performed prior to steps (i)-(ii).

18. The method of claim 17, wherein the AMR further comprises a broadband light emitter and a narrowband light sensor;

wherein the coupling structure further comprises a reflector;

wherein the method further comprises the steps of:

(a) emitting light from the broadband light emitter onto the reflector of the coupling structure;

(b) selectively reflecting the emitted light at a specific narrowband wavelength with the reflector; wherein the narrowband wavelength corresponds with an orientation of the AMR relative to the wheeled cart;

(c) recording the selectively reflected light with the narrowband light sensor;

(d) determining an orientation of the AMR relative to the wheeled cart based on the recorded narrowband wavelength;

(e) determining, from said AMR orientation, an orientation correction factor for adjusting an orientation of the AMR which includes adjusting a movement of the robot body or a rotation of the cart coupling system, or a combination thereof;

wherein the steps of (a)-(e) are performed prior to steps (i)-(ii).

19. The method of claim 18, wherein step (b) further comprises selectively reflecting the emitted light in one of at least three narrowband wavelengths or wavelength ranges, each wavelength or wavelength range being associated with a different orientation of the AMR relative to the wheeled cart; and, wherein step (d) further comprises determining one of one of at least three AMR orientations, said AMR orientations including at least a centered orientation, a right orientation and a left orientation of the AMR relative to the wheeled cart.

20. The method of claim 18, wherein step (d) further comprises determining an orientation of the AMR relative to the wheeled cart from the intensity of the recorded light.

* * * * *